United States Patent
Chesterfield et al.

(10) Patent No.: US 11,995,354 B2
(45) Date of Patent: May 28, 2024

(54) STORAGE AREA NETWORK CONTROLLER WITH INTEGRATED CIRCUIT HAVING A PLURALITY OF LOGIC PATHS

(71) Applicant: SUNLIGHT.IO LIMITED, Cambridge (GB)

(72) Inventors: Julian Chesterfield, Cambridge (GB); Michail Flouris, Heraklio (GR); Ioannis Velegrakis, Heraklio (GR)

(73) Assignee: SUNLIGHT.IO LIMITED, Cambridge (GB)

( * ) Notice: Subject to any disclaimer, the term of this patent is extended or adjusted under 35 U.S.C. 154(b) by 68 days.

(21) Appl. No.: 17/773,697

(22) PCT Filed: Oct. 22, 2020

(86) PCT No.: PCT/EP2020/079721
§ 371 (c)(1),
(2) Date: May 2, 2022

(87) PCT Pub. No.: WO2021/083780
PCT Pub. Date: May 6, 2021

(65) Prior Publication Data
US 2022/0405014 A1    Dec. 22, 2022

(30) Foreign Application Priority Data

Oct. 30, 2019  (GB) .................................... 19206370

(51) Int. Cl.
*G06F 12/00*      (2006.01)
*G06F 3/06*       (2006.01)

(52) U.S. Cl.
CPC .......... *G06F 3/0659* (2013.01); *G06F 3/0619* (2013.01); *G06F 3/064* (2013.01); *G06F 3/067* (2013.01)

(58) Field of Classification Search
CPC ...... G06F 3/0659; G06F 3/0619; G06F 3/064; G06F 3/067; G06F 3/0665; G06F 3/0611; G06F 3/0635
(Continued)

(56) References Cited

U.S. PATENT DOCUMENTS 6,349,357 B1    2/2002  Chong, Jr.
2009/0307388 A1  12/2009  Tchapda
(Continued)

FOREIGN PATENT DOCUMENTS

WO  WO-2018102416 A1 *  6/2018  .......... G06F 11/0709
WO  WO2018/102416      *  7/2018

OTHER PUBLICATIONS

International Search Report for PCT International Application No. PCT/EP2020/079721, 3 pages, dated Jan. 20, 2021.

*Primary Examiner* — Mardochee Chery
(74) *Attorney, Agent, or Firm* — SQUIRE PATTON BOGGS (US) LLP

(57) ABSTRACT

A storage controller for a storage area network that implements input-output commands in hardware is provided. Specific input-output commands are defined, including: a READ command, a WRITE command, a COPY command and a WRITE MIRROR command, all of which are implemented in hardware. A virtual logical unit table can be provided that enables the storage controller to implement a virtual storage management overlay function on top of a raw physical storage function.

13 Claims, 16 Drawing Sheets

(58) Field of Classification Search
USPC .......................................................... 711/154
See application file for complete search history.

(56) References Cited

U.S. PATENT DOCUMENTS

2016/0127492 A1* 5/2016 Malwankar ......... H04L 67/1097
709/212
2019/0042132 A1 2/2019 Khan et al.

\* cited by examiner

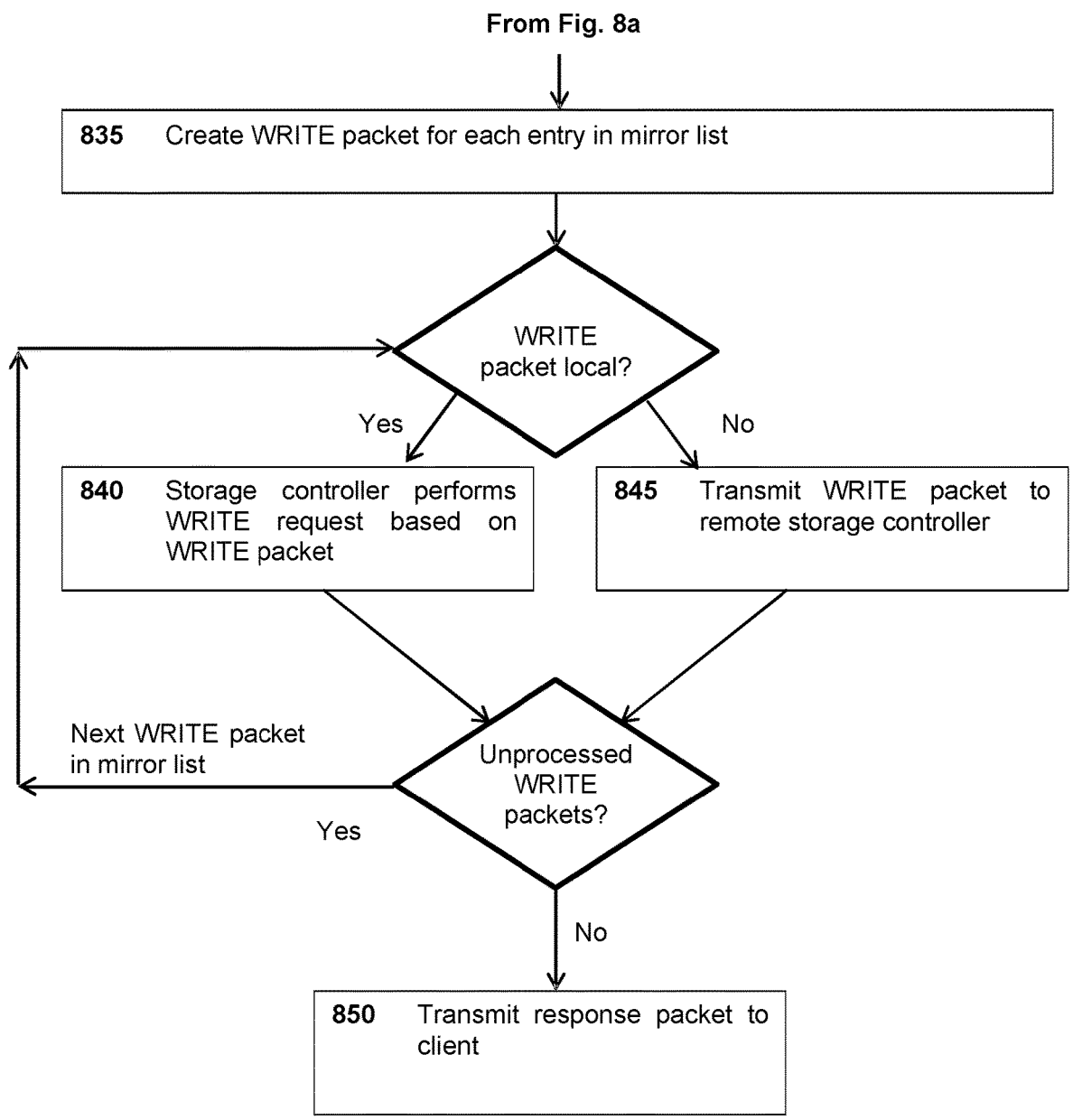

Fig. 10a

| Virtual LUN index | Virtual logical unit size | Pointer |
|---|---|---|
| 0 | 15625 | *0 |
| 1 | 28125 | *63999999 |
| 2 | 7500 | *179199999 |
| 3 | 32500 | *209919999 |

Fig. 10b

| Virtual block address | Physical block address |
|---|---|
| 0 | 1242 |
| 4095 | 5338 |
| 8191 | 9434 |
| .... | .... |
| 63999999 | 120658 |
| 64004095 | 124754 |
| 64008191 | 128850 |
| .... | .... |
| 179199999 | 64523 |
| 179204095 | 65131 |
| 179208191 | 69227 |
| .... | .... |
| 209919999 | 1520125 |
| 209924095 | 1524221 |
| 209928191 | 1528317 |

Header: LUN = 3

| Index | Logical unit block address | Write value |
|---|---|---|
| 0 | 0 | 0 |
| 1 | 16383 | 0 |
| 2 | 32767 | 1 |
| 3 | 49151 | 0 |
| 4 | 65535 | 0 |
| 5 | 81919 | 0 |
| 6 | 98303 | 1 |
| ... | ... | ... |

Fig. 14

Header: CHILD LUN = 1

| Index | Child virtual logical unit block address | Write value | Physical logical unit block address |
|---|---|---|---|
| 0 | 0 | 0 | 180943 |
| 1 | 16383 | 0 | 197327 |
| 2 | 32767 | 1 | 213711 |
| 3 | 49151 | 0 | 230095 |
| 4 | 65535 | 0 | 246479 |
| 5 | 81919 | 0 | 262863 |
| 6 | 98303 | 1 | 279247 |
| … | … | … | … |

STORAGE AREA NETWORK CONTROLLER WITH INTEGRATED CIRCUIT HAVING A PLURALITY OF LOGIC PATHS

CROSS-REFERENCE TO RELATED APPLICATIONS

This application is a national-phase filing under 37 USC 371(c) of International Application No. PCT/EP2020/079721, filed Oct. 22, 2020, which claims priority to, and the benefit of, Great Britain Application GB19206370.9, filed Oct. 30, 2019. The entire contents of each of these applications are incorporated herein by reference in their entirety for all purposes.

FIELD OF INVENTION

This invention relates generally to storage area network controllers, and particularly to storage area network controllers that implement a set of input-output operations using specific-purpose hardware.

BACKGROUND

It is estimated that approximately 90% of the total volume of electronic data in existence today was generated in the last two years. This ever-increasing volume of data, coupled with the increased use of Cloud-based services, has led to a corresponding increase in the importance of storage area networks.

A storage area network typically includes one or more storage area network servers coupled to a set of physical storage devices via a so-called 'fabric' that is usually made up of some combination of network adaptors, switches, routers, gateways and cables. Each server can include one or more storage controllers coupled to the physical storage via the fabric, the storage controllers for handling data requests from clients of the server. Read requests are routed to the storage controller(s) associated with the relevant physical storage device(s) holding the required data, for retrieval of said data. Write requests are handled in a similar manner, with a region of one or more of the physical storage devices being allocated to write the data specified by the write request.

A storage controller typically comprises a general purpose central processing unit (CPU) coupled to a memory and a network adaptor that provides access to the fabric. The memory contains an operating system and storage controller software, such that the CPU is able to run the operating system and storage controller software to perform all necessary storage controller functionality.

The CPU is responsible for handling each incoming request in its entirety, i.e. processing the request, identifying the necessary read and/or write operations, instructing said operations, receiving the response(s) from the physical storage device(s) and returning an appropriate response to the requesting client. As a result, the CPU can act as a bottleneck at times where processing load is relatively high, e.g. where there are a relatively high volume of requests from client devices. This can lead to undesirably high latencies on client device requests. Additionally, the CPU is generic and so not specialised to any particular input-output operation, meaning that some operations can take longer than is ideal for the CPU to complete.

It is therefore desirable to provide a storage controller that is able to provide responses to requests at an acceptable latency even when a request volume is relatively high. Preferably, the storage controller would also alleviate at least some of the processing burden on client devices making requests of the storage area network.

SUMMARY OF THE INVENTION

In a first aspect, the invention provides a computer-implemented method for operating a storage controller, the storage controller comprising a storage controller memory and an integrated circuit having a plurality of logic paths each comprising one or more logic blocks, the storage controller coupled to a client device via a network, the method comprising: a) receiving, by the storage controller, a packet from the client device sent over the network; and b) attempting, by the storage controller, to identify a command associated with the packet, the command for performing an input-output operation in respect of a storage medium; wherein, in the event the storage controller successfully identifies a command associate with the packet, the method further comprises: c) selecting, by the storage controller and based on the identified command, a selected logic path corresponding to the identified command from the plurality of logic paths; and d) executing, by the storage controller, the identified command using the selected logic path.

In a second aspect, the invention provides a storage controller comprising a storage controller memory and an integrated circuit having a plurality of logic paths each comprising one or more logic blocks, the storage controller coupled to a client device via a network, wherein the storage controller is configured to: a) receive a packet from the client device sent over the network; and b) attempt to identify a command associated with the packet, the command for performing an input-output operation in respect of a storage medium; wherein, the storage controller is further configured to: in the event the storage controller successfully identifies a command associate with the packet, c) select, based on the identified command, a selected logic path corresponding to the identified command from the plurality of logic paths; and d) execute the identified command using the selected logic path.

In a third aspect, the invention provides a computer-readable storage medium storing instructions which, when executed by a storage controller, cause the storage controller to perform the following steps: a) receiving, by the storage controller, a packet from the client device sent over the network; and b) attempting, by the storage controller, to identify a command associated with the packet, the command for performing an input-output operation in respect of a storage medium; wherein, in the event the storage controller successfully identifies a command associate with the packet, the method further comprises: c) selecting, by the storage controller and based on the identified command, a selected logic path corresponding to the identified command from the plurality of logic paths; and d) executing, by the storage controller, the identified command using the selected logic path.

BRIEF DESCRIPTION OF THE DRAWINGS

Embodiments of the present invention are described below, by way of example only, with reference to the accompanying drawings, in which:

FIGS. 8a and 8b are flow diagrams illustrating a WRITE MIRROR command that may be performed by the storage controller of FIG. 2, according to an embodiment;

FIG. 10a is a graphical representation of a virtual LUN table according to an embodiment;

FIG. 10b is a graphical representation of a block address translation table according to an embodiment;

FIG. 14 is a graphical representation of a child write tracking table according to an embodiment.

DETAILED DESCRIPTION OF EMBODIMENTS

As used herein, the terms listed below have the following meaning:

'Physical storage' is understood to refer to the physical hardware that electronic data is stored on in some manner, e.g. the platter of a hard disk drive or flash memory unit of a solid state drive. The prefix 'physical' is used to denote properties or parameters of physical storage—e.g. a 'physical block address' refers to a block address corresponding to a region of storage on a physical medium such as a hard drive platter.

'Virtual storage' is understood to refer to an entity that is established digitally but which has no corresponding physical manifestation. It will thus be understood that a virtual storage device is described at a fundamental level by a mapping to one or more regions of one or more physical storage devices that are used to store the data associated with the virtual storage device. Higher level operations 'see' only the virtual storage device, and have no knowledge of the underlying physical storage device(s). The prefix 'virtual' is used to denote properties or parameters of virtual storage— e.g. a 'virtual block address' refers to a memory block corresponding to a region of storage associated with a virtual medium. The virtual block address will be mapped to a corresponding physical block address, with this physical block address being invisible to all but the very lowest level of operations.

The term 'location' is understood to encompass both physical block address(es) and virtual block address(es). In the following, any specific cases where this is not applicable will be indicated by the appropriate prefix, e.g. 'physical location' refers only to a (range of) physical block address(es).

A 'general purpose processor' (equivalently, 'general purpose CPU', 'CPU', or similar) is understood to refer to a processor that is capable of carrying out many tasks, i.e. the processor is not specialised for any particular task or set of tasks. A well-known example of a general purpose processor is a processor with the Reduced Instruction Set architecture as is known in the art.

A 'logical unit' is a storage device that is addressable by a recognised protocol, e.g. Fibre Channel or Internet Small Computer Systems Interface (iSCSI). A single physical storage device can comprise multiple logical units, e.g. by partitioning, and a single logical unit can encompass multiple physical storage devices. A logical unit has an associated Logical Unit Number (LUN) which is a number that uniquely identifies the logical unit. Virtual logical units can be defined, with corresponding virtual LUNs.

Figure 1:
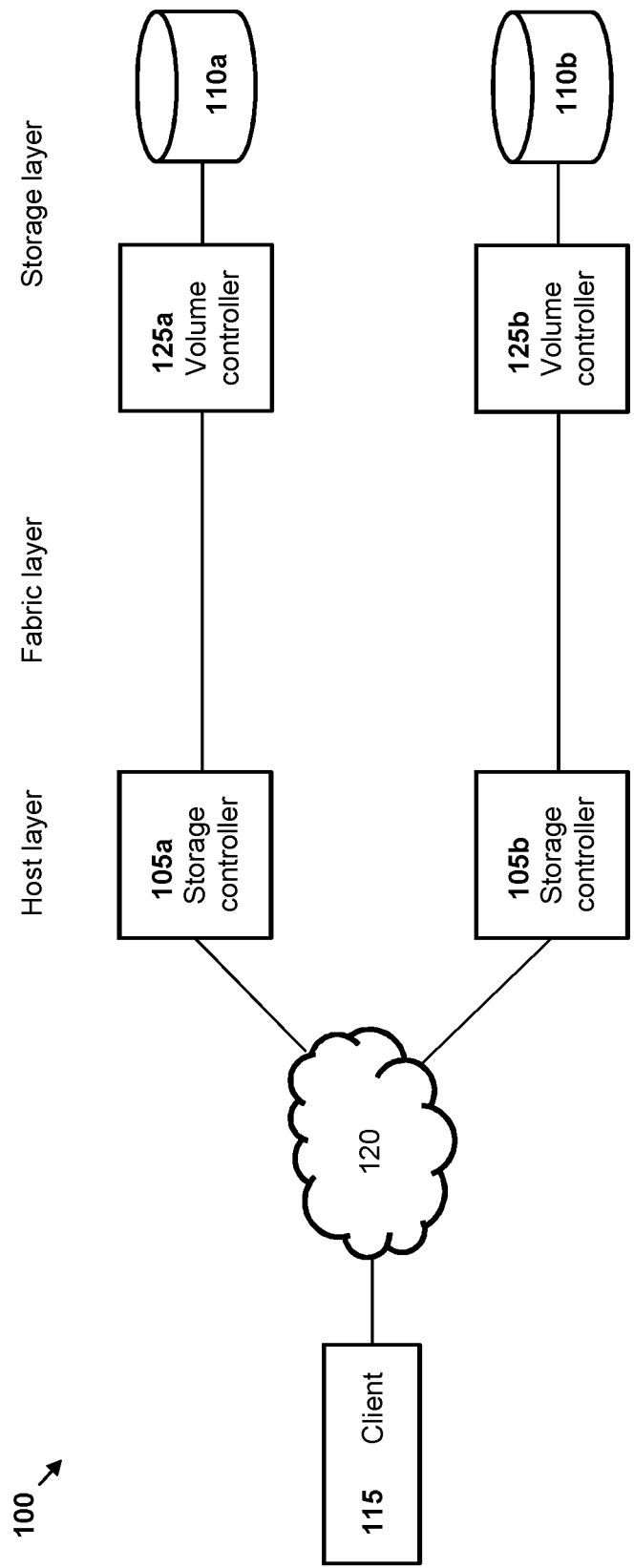
FIG. 1 illustrates a system in which a storage controller according to the present invention can operate, in accordance with an embodiment.

An exemplary system 100 for implementing the present invention is shown in FIG. 1 in block diagram form. It will be appreciated that the representation of system 100 has been greatly simplified to assist in the understanding of the principles of the present invention, and that a practical implementation of the invention is highly likely to be significantly more complex than shown in FIG. 1.

System 100 includes a host layer comprising one or more storage controllers. Two storage controllers 105a, 105b are illustrated in FIG. 1, but it will be appreciated that any number of storage controllers (including one) could be present. Further details on each storage controller are provided later in this specification. The one or more storage controllers may be part of a storage area network server or servers (not shown), which server(s) handle incoming requests from client device 115.

Each storage controller 105a, 105b is in communication with a respective storage device 110a, 110b via one or more network components collectively referred to as a fabric. The fabric, or equivalently fabric layer, comprises any components necessary to enable communication between the host layer and the storage layer, e.g. one or more routers, switches, gateways, physical cables (e.g. optical fibre cables) and the like. The fabric layer is conventional and so is not described in further detail here.

Storage devices 110a, 110b are part of a storage layer that stores data on non-volatile storage media. Each storage device can take many forms, e.g. one or more hard disk drives, one or more solid state drives, one or more magnetic tapes, etc., and combinations thereof. Each storage device can be operated by a volume controller 125a, 125b, with the volume controller being responsible for instructing read and write operations in respect of its corresponding storage device. The storage layer is conventional and so is not described in further detail here.

A client device 115 can form part of system 100. Client device 115 is any data processing device that is capable of generating requests for processing by the host layer. Client device 115 can be, for example: a desktop computer, a laptop, a mobile device (e.g. a tablet or mobile phone), a games console, a web server, an Internet of Things device (e.g. a smart television), and the like.

Client device 115 is communicatively coupled to the host layer via a network 120, e.g. a public network such as the internet, a private network or a virtual private network. Although only one client device is illustrated in FIG. 1, it will be appreciated that a plurality of client devices can be present and further that these client devices can simultaneously make requests of the host layer. In practical realisations of the invention many tens, hundreds, thousands or even greater numbers of clients may be serviced simultaneously by the host layer.

Client device 115 is configured to generate requests for processing by the host layer. The present invention implements any combination of the following commands which may form part of a request from client device 115:
READ command;
WRITE command;
COPY command;
WRITE MIRROR command;
CHECKPOINT command; and
SNAPSHOT command.

Full details of each command are provided later in this specification.

Figure 2:
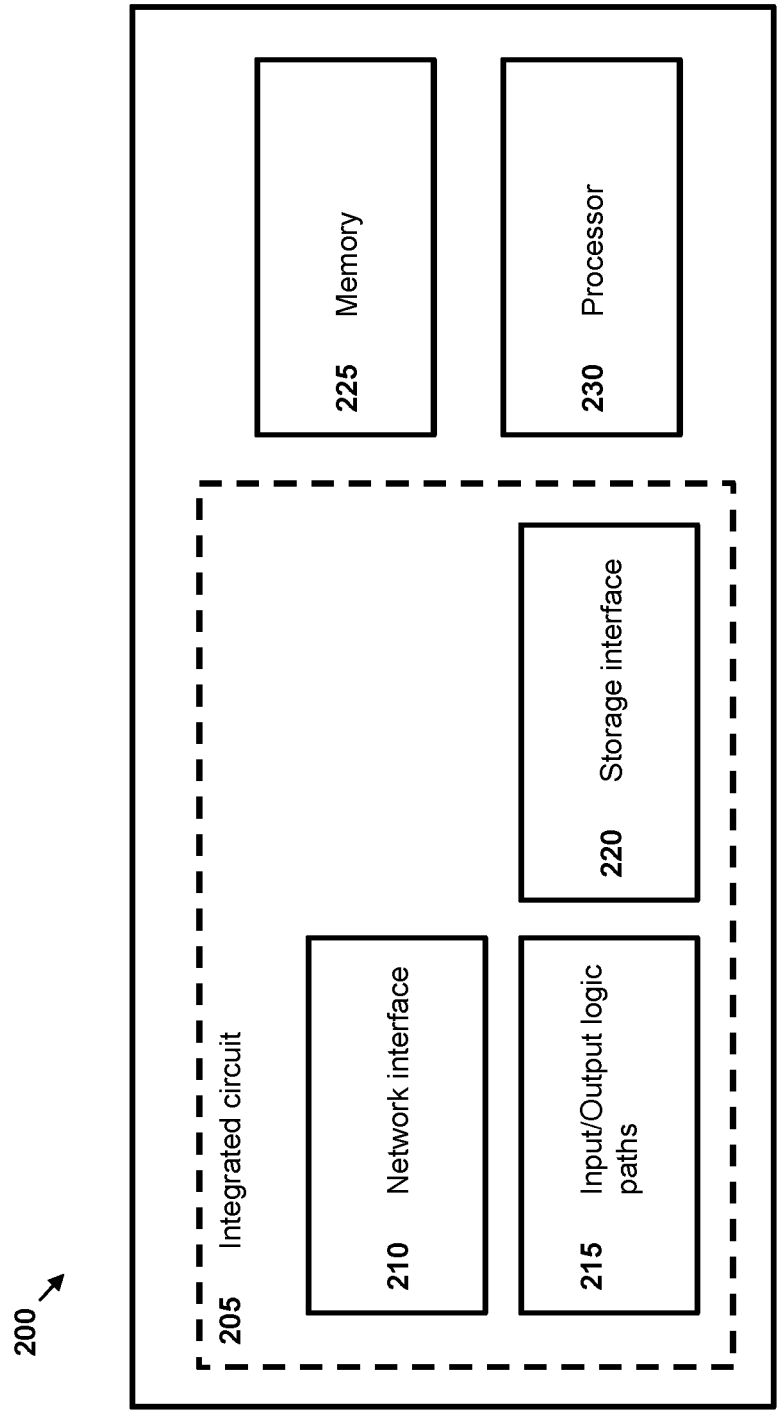
FIG. 2 is a high level block diagram of a storage controller according to an embodiment.

FIG. 2 illustrates in schematic form of a storage controller 200 suitable for use in the system 100, e.g. as storage controller 105a and/or 105b. An exemplary, more detailed, implementation of storage controller 200 is provided in FIG. 15.

Storage controller 200 comprises an integrated circuit 205 that implements specific functionality. Certain logic paths of the integrated circuit 205 implement a network interface 210, other logic paths implement input/output logic paths 215 and further logic paths implement a storage interface 220.

A 'logic path' is understood to indicate a particular subset of components within the integrated circuit that are configured to implement the function assigned to the logic path. The components that make up a logic path are referred to herein as 'logic blocks', with a logic path being made up of one or more logic blocks. A logic block implements a basic logical function, e.g. AND, OR, NOT, etc. Electronic components suitable for implementing these basic logical functions will be apparent to a skilled person.

Each logic path is a specialist hardware arrangement that includes specific logic blocks configured to specifically provide the functionality assigned to it. Integrated circuit 205 and its various logic paths should therefore be distinguished from a general purpose processor, with the former being configured for particular tasks and the latter being configured for general purpose use. In a preferred embodiment the integrated circuit comprises one or more reconfigurable hardware components, e.g. field-programmable gate arrays (FPGAs). This is however not essential, and other task-specific configurations such as application specific integrated circuits (ASICs) can be used instead.

It will be appreciated that, all else being equal, integrated circuit 205 will complete an assigned operation more quickly than a general purpose processor tasked with the same operation. This is because the integrated circuit 205 can employ a logic path specifically designed and optimised to perform the assigned operation, whereas the general purpose processor must make use of generic hardware logic that is non-optimal for the specific task. Additionally, each logic path is independent of the others, meaning that integrated circuit 205 is generally able to more effectively parallel process multiple tasks than a general purpose processor. As a result, integrated circuit 205 offers improvements in performance that translate into a lower average latency on requests from client device 115 than an equivalent prior art storage controller implemented by a general purpose processor.

Further reductions in latency and/or client processing load can be realised when implementing the specific commands described later in this specification.

Moreover, it will be appreciated by one of skill in the art that storage controller 200 is entirely stateless, meaning that each packet received by storage controller 200 can be processed independently of any other packet. This enables incoming commands to be processed by storage controller 200 at or near line rate, i.e. as fast as the hardware can physically support the movement of data, since there is no need for storage controller 200 to delay processing of one packet whilst it waits for another to be received or processed. This does mean that responsibility for data coherency is placed on the client device, but in general this represents a minor fraction of the total processing load associated with interaction between the client device and the storage layer. Therefore, in general, the present invention can decrease the latency of interaction with the storage layer whilst also reducing client device processing load.

Storage controller 200 further comprises a memory 225. This may be a volatile memory, e.g. DRAM, and is preferably a high speed volatile memory. Memory 225 can be used to store data pertinent to operations of storage controller 200, e.g. data tables of the type described later.

Storage controller 200 can also include a general purpose processor 230. Processor 230 handles requests that are not related to storage operations, e.g. configuration requests relating to data tables used by storage controller 200. Configuration requests are expected to be in the minority in usual operation of storage controller 200, and furthermore not associated with any particular urgency, such that latency in handling of these requests is not of particular importance. Inclusion of processor 230 as part of storage controller 200 is optional, as configuration of storage controller 200 can alternatively be performed by an external processor.

Network interface 210 is configured to receive incoming requests from client device 115 and to route the requests according to their content. The requests may be in the form of one or more data packets, which packets may be formatted according to a packet-based network protocol with the constituent command(s) being formatted according to a mass storage device protocol. By way of example, the packets may be formatted in the Advanced Technology Attachment over Ethernet (AoE) protocol that is known in the art per se. In this case, the network interface is an Ethernet network interface. Other equivalent protocols and network interfaces may be used instead.

In the case where the AoE protocol is used, the storage controller is preferably configured to support larger size Ethernet frames, e.g. supporting frames having a maximum transmission unit (MTU) of 5 KB, and preferably frames with a MTU of 9 KB. Supporting larger frames advantageously enables a single packet to contain a header and also at least one data page, which is typically 4 KB, meaning that latency is reduced as a single packet can contain at least one page worth of data. This is however not essential, as it is possible to implement the invention with any size MTU being supported.

Routing by network interface 210 can include routing the packet to one of input/output logic paths 215, for implementing a specific command of the type discussed in detail later in this specification. The particular integrated components selected for each command will be apparent to the skilled person having the benefit of this disclosure, and in particular the description of each command provided later. An exemplary set of components is also provided in connection with FIG. 15.

Routing by network interface 210 can also include routing the packet to another storage controller. This can occur when network interface 210 determines from a parameter of the packet e.g. a media access control (MAC) address, that the packet relates to a storage device that is not local to storage controller 200. The routing can be performed by another logic path that is specifically configured for this task.

Routing by network interface 210 can further include detecting a request type of an incoming request and routing the request to processor 230 for further processing when the request type indicates that the request is not associated with a storage operation. In a particular implementation making use of the AoE protocol, network interface 210 may be configured to examine the EtherType of an incoming packet to determine whether the EtherType is equal to a predetermined value that indicates that the packet is an AoE packet. The predetermined value may be 0x88A2, for example, which is known in the art as indicating that a packet is an AoE packet. Equivalent predetermined values, e.g. for protocols other than AoE, will be selected by a skilled person having the benefit of the present disclosure. In the case where the EtherType is not equal to the predetermined value, network interface 210 determine that the packet is not an AoE packet and can consequently route the packet to processor 230 for further processing.

It will be appreciated that the present invention thus enables network to storage connectivity to be handled entirely by hardware logic, i.e. the storage controller processes network packets instructing input-output operations directly in hardware without recourse to any software stack or general purpose processor. Input-output operations can therefore be processed rapidly, e.g. at or near line rate, reducing latency for input-output requests.

Figure 3:
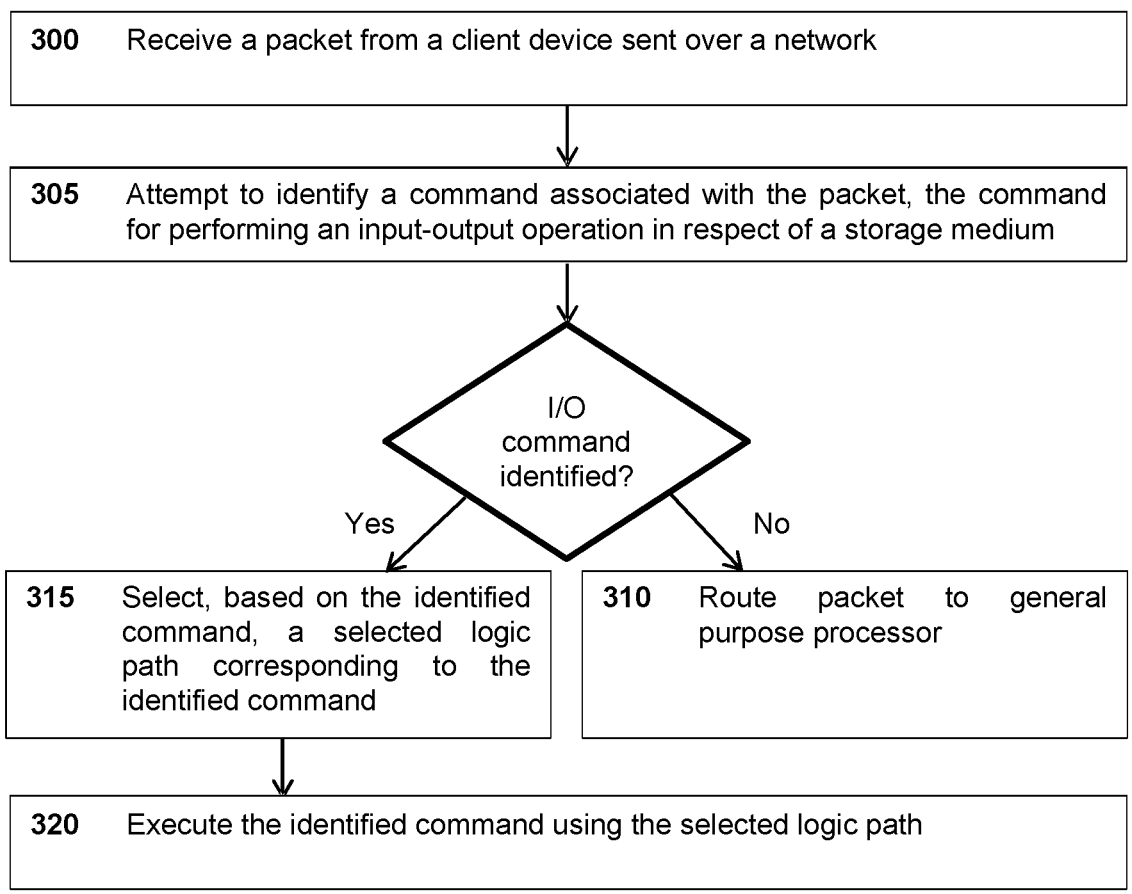
FIG. 3 is a flow diagram illustrating a mode of operation of the storage controller of FIG. 2, according to an embodiment.

FIG. 3 illustrates a flow diagram corresponding to a method of operating a storage controller, e.g. storage controller 200.

In step 300, storage controller 200 receives a packet from a client device, e.g. client device 115, sent over a network, e.g. network 120. The packet can be formatted according to a packet-based network protocol and may encode a command that is formatted according to a mass storage device protocol. For example, the packet may be in AoE format as is known in the art per se, with the command formatted as an Advanced Technology Attachment, ATA, command, as is also known in the art per se.

In step 305, storage controller 200 attempts to identify a command associated with the packet, the command for performing an input-output operation in respect of a storage medium, e.g. storage devices 110a, 110b, or a virtual storage device. Step 305 can involve parsing the content of the packet to identify a flag, indicator, value, or other such parameter that indicates that the packet encodes an input-output operation. In a particular implementation making use of the AoE protocol, storage controller 200 may examine the EtherType of an incoming packet to determine whether the EtherType is equal to a predetermined value, e.g. 0x88A2. In the case where the EtherType is not equal to the predetermined value, the storage controller determines that the packet is not an AoE packet and therefore is not associated with an input-output command. Other suitable techniques for determining whether a given packet contains a command associated with an input-output operation will be apparent to a skilled person having the benefit of the present disclosure.

In the event storage controller 200 is unable to identify a command for performing an input-output operation within the packet, storage controller 200 proceeds to step 310 and routes the packet to general purpose processor 230. In such a case the packet may be, for example, an instruction to create or delete a logical unit. Further details on this process are provided in connection with the section headed 'Configuration Commands' later in this specification. Storage controller 200 may make use of a particular logic path, e.g. a FWD_TO_CPU logic path, to route the packet to general purpose processor 230, the particular logic path being configured specifically for this routing operation.

In the event storage controller 200 is able to identify a command for performing an input-output operation with the packet, storage controller 200 proceeds to step 315 and selects, based on the identified command, a selected logic path corresponding to the identified command. Selection of the logic path can include matching the identified command with a corresponding logic path for executing said command. For example, if the identified command is a READ command, storage controller 200 selects an input-output logic path for execution of the READ command. Details of this operation will depend upon the specifics of the configuration at hand, and a particular configuration according to an embodiment is described later in connection with FIG. 15.

Following identification of the selected logic path, in step 320 storage controller 200 executes the identified command using the selected logic path. As will be appreciated from the foregoing, input/output commands are executed entirely via use of logic paths of the storage controller, leading to reduced latency compared with processing by a general purpose processor.

In systems having multiple storage controllers, step 315 may include examining an address of an incoming packet to determine whether a destination address of the packet is local to storage controller 200 or remote from storage controller 200. The address may be a MAC address, for example. In the case where the destination address is local to storage controller 200, storage controller 200 may handle the packet itself. In this case, storage control 200 may identify a logic path corresponding to the command type, e.g. a READ or WRITE command is handled by an input-output logic path. In the case where the destination address is not local to storage controller 200, storage controller 200 may process the packet by forwarding it to another storage controller, e.g. the storage controller that is local to the destination address of the packet. This may be achieved using a FWD_TO_REMOTE logic path.

Having described the operation of storage controller 200 generally, the following provides a detailed discussion of specific commands that storage controller 200 may handle. This discussion is in the context of AoE format packets as are known per se in the art, but it will be appreciated that the principles established below are readily adaptable to any packet format.

Figure 4:
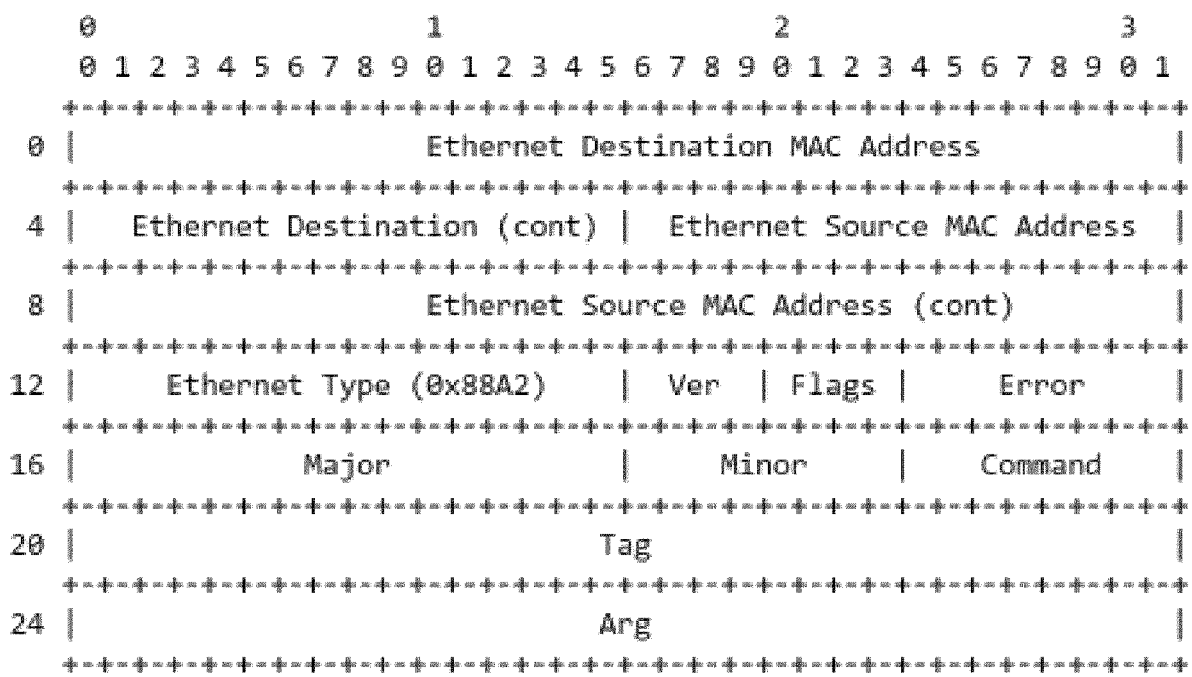
FIG. 4 is a graphical depiction of a header of an ATA over Ethernet network packet, according to an embodiment.

FIG. 4 illustrates the AoE header format as known in the art. This representation shows the bit-wise alignment of each region of the header. The 'major' and 'minor' fields are used to specify a logical unit shelf and slot, as known in the art per se, to enable the input/output command to be routed to the correct logical unit.

In accordance with an embodiment of the invention making use of the AoE protocol, values for the command portion of the standard header, cmd, are defined as follows:

| Name | Value |
|---|---|
| AOE_CMD_ATA | 0x00 |
| AOE_CMD_CONFIG | 0x01 |
| AOE_CMD_XATA | 0x02 |

It will be appreciated that these values are purely exemplary and that other alternative values may instead be used.

A value of 0x00 for cmd indicates that the AoE packet encodes an ATA-format input/output command for processing by a corresponding input/output logic path of storage controller 200. The packet in this case includes the standard AoE headers and a new, additional header that enables specific command types to be identified. This additional header may be referred to as aoeata in the following.

A value of 0x01 for cmd indicates that the AoE packet encodes a configuration command for processing by general purpose processor 230. The configuration command CONFIG relates to configuration of the storage controller and does not specify any input/output operation. Such packets are forwarded to general purpose processor 230 without additional processing via a FWD_TO_CPU logic path of storage controller 200.

A value of 0x02 for cmd indicates that the AoE packet encodes an Extended ATA-format ('XATA') input/output command for processing by a corresponding input/output logic path of storage controller 200. The XATA format includes both the additional header aoeata and an extension to this new header, the extension providing sufficient space to enable additional information to be encoded beyond that offered by the ATA-format header. The XATA format additional header may be referred to as aoexata in the following. By way of non-limiting example, the extension to the aoeata header may be 128 bytes.

An XATA format packet can be used to implement an extended write command, referred to as a WRITE MIRROR command herein, and a COPY command, in the following manner.

In this embodiment, the aoeata header that includes a command type field cmd_stat that specifies a particular command. Valid values for the command type field are as follows:

| Command Type | Value |
|---|---|
| AOE_ATA_READ | 0x24 |
| AOE_ATA_WRITE | 0x34 |
| AOE_CMD_COPY | 0x44 |

It will be appreciated that these values are purely exemplary and that other alternative values may instead be used.

Different packet structures are present depending on the value for the cmd_stat field. Each command is discussed in turn below.

Read

The READ command includes a mechanism for specifying a region of the target logical unit containing the data that is to be read, e.g. a storage address region or virtual storage address region identifying one or more physical/virtual block addresses that contain the data that is required. This may be achieved, for example, by specifying a starting virtual/physical block address, which may be referred to as a 'starting sector', and a number of consecutive virtual/physical block addresses to access in the read operation, which may be referred to as a number of sectors.

The following structure can be used for the READ command. The structures ethhdr and aoehdr are standard, and the structure aoeata is new and in accordance with the invention.

```
#define ETH_ALEN 6
struct ethhdr {
    unsigned char h_dest[ETH_ALEN];
    unsigned char h_source[ETH_ALEN];
    _be16    h_proto;
} _attribute_((packed));
struct aoehdr {
    u8 ver_flags;
    u8 error;
    u16 major;
    u8 minor;
    u8 cmd;
    u32 tag;
} _attribute_ ((packed));
struct aoeata {
    u8 aflags;
    u8 err_feat;
    u8 count;
    u8 cmd_stat;
    union {
        u64 val;
        u8 ary[6];
    } lba;
} _attribute_ ((packed));
```

This structure is purely exemplary and other suitable encoding schemes for the READ command will be apparent to a person skilled in the art having the benefit of the present disclosure. In particular, equivalent encoding schemes in alternative protocols to AoE, for example iSCSI, will be apparent to a skilled person having the benefit of the present disclosure.

In this structure major and minor respectively define a logical unit shelf and slot so as to identify a particular logical unit as the target for the read command, cmd_stat identifies the command type (in this case AOE_ATA_READ), lba identifies a starting sector for the read operation, and count specifies a number of sectors to be read. aflags and err_feat are fields relating to handling of errors.

A response to the READ command can be formatted as an AoE packet according to the same structure as defined above. Assuming the read operation was successful, the data read can be appended to the end of the AoE response packet as a payload. A read failure can be signalled by modification of a value in one of the aforementioned fields, e.g. modification of the cmd_stat value. The modification could be, for example, 0x24 OR (1<<2). Variations on this are of course possible.

In some implementations a READ request is allowed to specify a zero size target, e.g. specifying zero sectors for reading by setting the value of the count field to zero. Such zero size READ requests may be indicative of a keep-alive request for the logical unit identified in the major and minor fields of the standard AoE packet header. Preferably, storage controller 200 is configured to detect a zero size READ request, e.g. by determining whether the value in the count field is equal to zero, and to process any such keep-alive READ requests by forwarding the keep-alive READ request to processor 230 via a FWD_TO_CPU logic path.

Figure 5:
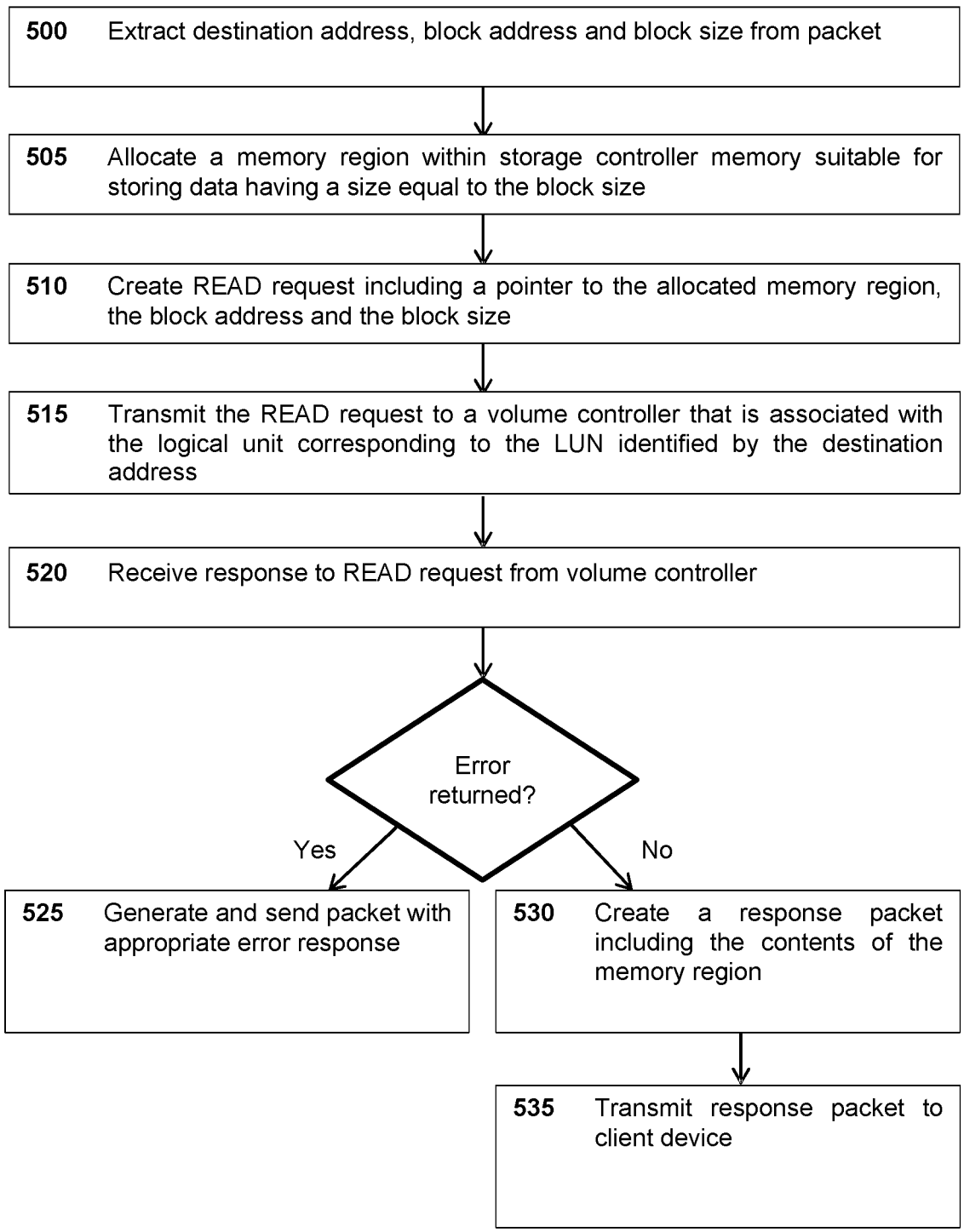
FIG. 5 is a flow diagram illustrating a READ command that may be performed by the storage controller of FIG. 2, according to an embodiment.

Storage controller 200 can process a READ command via the method illustrated in FIG. 5 and described in the following. The method of FIG. 5 can be performed as part of step 320 of FIG. 3. In this case, the identification performed in step 305 has determined that the packet received in step 300 contains a READ command and storage controller 200 has selected a corresponding input-output logic path for execution of the READ command.

In step 500, storage controller 200 extracts a destination address, a block address and a block size from the packet. The destination address specifies a logical unit having an associated logical unit number, LUN. The destination address may be converted into a LUN using a LUN table, which may be stored in a high speed memory of storage controller 200 (e.g. BRAM 1515, see FIG. 15). In the event that a LUN corresponding to the destination address specified in the packet cannot be found, storage controller 200 may abort the READ operation and return an error, e.g. an input-output response error that indicates that the LUN could not be found.

The destination address, block address and block size enable storage controller 200 to determine a target LUN and a target block address range associated with this LUN, where the block address range starts at the block address and extends over a number of block addresses equal to the block size. The logical unit corresponding to the LUN may be a virtual logical unit, in which case the block address is a virtual block address.

In the case of the AoE packet discussed above, the block address can be contained in the lba field, the block size can be contained in the count field and the destination address can be contained in the major and minor fields. As part of step 500, storage controller 200 may be configured to look up the shelf and slot values respectively contained in the major and minor fields in a LUN table stored in a high speed memory of the storage controller (e.g. BRAM 1515, see FIG. 15). The LUN table may include a set of LUNs identifiable by shelf and slot number, enabling storage controller 200 to convert a pair of values <shelf, slot> into a LUN.

In step 505, storage controller 200 allocates a memory region within a high speed memory of the storage controller (e.g. rdBuff URAM module, see FIG. 15) that is suitable for storing data having a size equal to the block size. This memory region will temporarily hold the data read from the storage layer, before transmission of this data to client 115.

In step 510, storage controller 200 creates a READ request that includes a pointer to the allocated memory region, the block address and the block size. Depending on the format, the READ request may also specify that it is a READ request, to enable a recipient volume controller to determine the command type. The READ request can be in any format that is interpretable by a volume controller, e.g. volume controller 125a, that is coupled to the storage device, e.g. storage device 110a, that is relevant to the READ request. An exemplary format for the READ request is the ATA format known in the art per se.

Following creation of the READ request, in step 515 storage controller 200 transmits the READ request to a volume controller that is associated with the logical unit corresponding to the LUN identified by the destination address extracted in step 500.

Storage controller 200 processes the READ request in a conventional matter and in step 520, storage controller 200 receives a response to the READ request from the volume controller.

Steps 515 and 520 can also include the following operations: storage controller 200 stores a header of the READ request as an entry in a 'pending request' list or table that is stored in memory. When the volume controller has finished servicing the READ request, it may update the entry in the pending request list/table by invoking an interrupt or mark completion of the request in a descriptor that points to the entry. Detection of this change can signify to storage controller 200 that the READ request has been serviced.

Upon receipt of the response, storage controller 200 checks whether any error has been returned in the response. In the event that an error has been returned, storage controller 200 proceeds to step 525 in which it generates and sends a packet with an appropriate error response.

In the event that an error has not been returned, storage controller 200 proceeds to step 530 and creates a response packet including the contents of the memory region that was allocated in step 505, i.e. the response packet includes the data read from the storage layer. Storage controller 200 then transmits the response packet to client device 115 via network 120 (step 535).

Optionally, after step 530 or after step 535, storage controller 200 may deallocate the space in the memory used to store the data read from the storage layer. Space used to store the response packet may also be deallocated. This deallocation may reduce latency of subsequent operations because it frees up space in the memory as soon as it is possible to do so, enabling this space to be re-used by a subsequent operation, e.g. another READ request.

Write

The purpose of a WRITE command is to write data provided by client device 115 to the storage layer.

The packet structure defined above for the READ command can also be used for the WRITE command. In this case, the WRITE request additionally includes the data to be written appended as a payload to the packet. In the case of a WRITE command, it will be appreciated that the parameter cmd_stat is set to AOE_ATA_WRITE, lba identifies a starting sector for the write operation, and count specifies a number of sectors to be written to. The response to the WRITE request differs from the READ response in that the data written is not appended to the WRITE response packet.

In some cases it may be advantageous to allow a WRITE request to specify a zero size target, e.g. specifying zero sectors for writing by setting the value of the count field to zero. Such zero size WRITE requests may be indicative of a CHECKPOINT request for the logical unit(s) identified in the major and minor fields of the standard AoE packet header. CHECKPOINT requests are described later in this specification. Preferably, storage controller 200 is configured to detect a zero size WRITE request, e.g. by determining whether the value in the count field is equal to zero, and to process any such zero-size WRITE requests by forwarding the zero-size WRITE request to processor 230 via the FWD_TO_CPU logic path.

Figure 6:
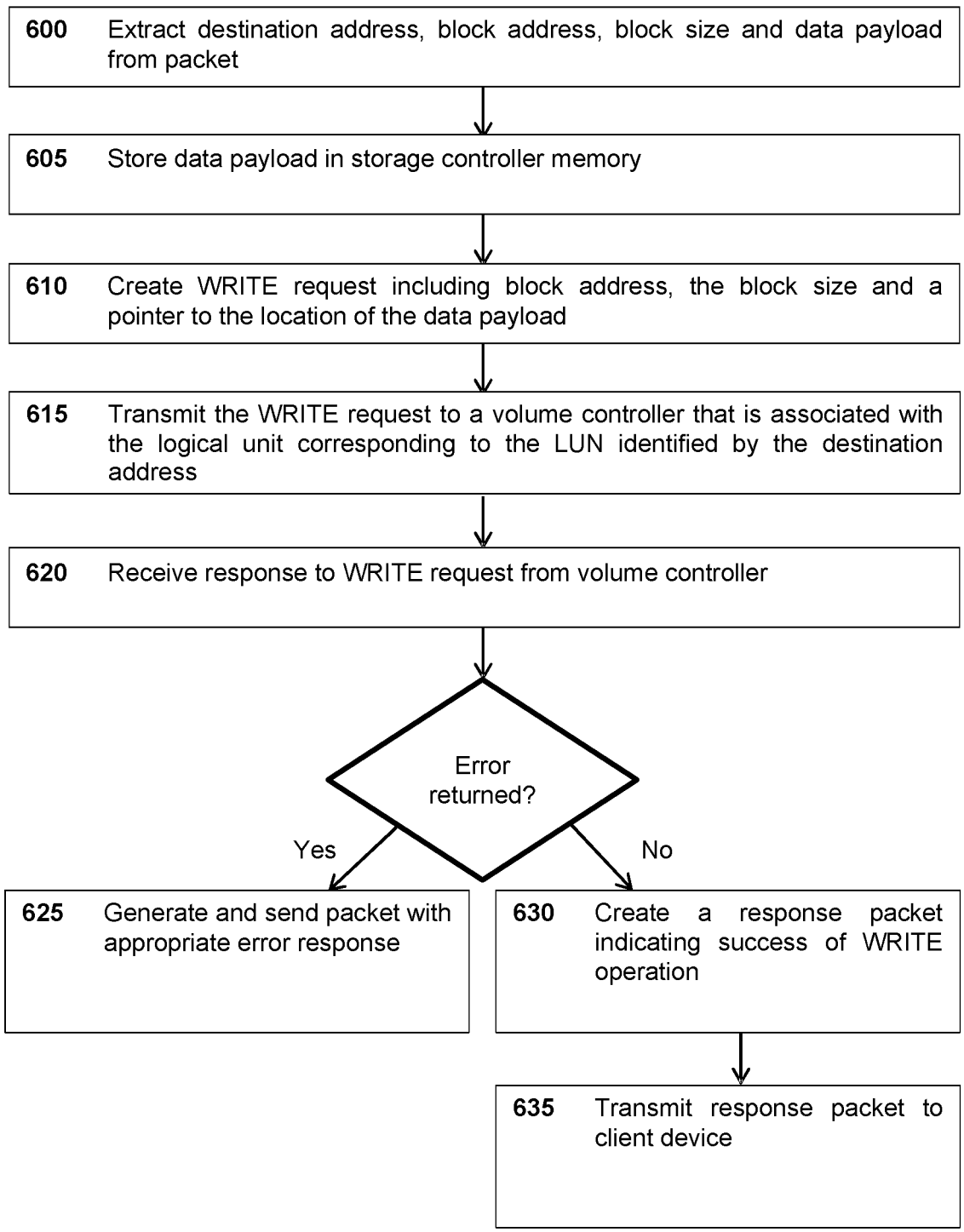
FIG. 6 is a flow diagram illustrating a WRITE command that may be performed by the storage controller of FIG. 2, according to an embodiment.

Storage controller 200 can process a WRITE command via the method illustrated in FIG. 6 and described in the following. The method of FIG. 6 can be performed as part of step 320 of FIG. 3. In this case, the identification performed in step 305 has determined that the packet received in step 300 contains a WRITE command and storage controller 200 has selected a corresponding input-output logic path for execution of the WRITE command.

In step 600, storage controller 200 extracts a destination address, a block address, a block size and a data payload from the packet. The destination address specifies a logical unit having an associated logical unit number, LUN. The destination address may be converted into a LUN using a LUN table, which may be stored in a high speed memory of the storage controller (e.g. BRAM 1515, FIG. 15). In the event that a LUN corresponding to the destination address specified in the packet cannot be found, storage controller 200 may abort the WRITE operation and return an error, e.g. an input-output response error that indicates that the LUN could not be found. The data payload is the data that is to be written to the storage layer, which data payload may have been provided by client device 115.

The destination address, block address and block size enable storage controller 200 to determine a target LUN and a target storage range associated with this LUN, where the storage range starts at the block address and extends over a number of block addresses equal to the block size. The logical unit corresponding to the LUN may be a virtual logical unit, in which case the block address is a virtual block address.

In the case of the AoE packet discussed above, the block address can be contained in the lba field, the block size can be contained in the count field and the destination address can be contained in the major and minor fields. As part of step 500, storage controller 200 may be configured to look up the shelf and slot values respectively contained in the major and minor fields in a LUN table stored in a high speed memory of the storage controller. The LUN table may include a set of LUNs identifiable by shelf and slot number, enabling storage controller 200 to convert a pair of values <shelf, slot> into a LUN. The block size corresponds to the size of the data payload.

Figure 15:
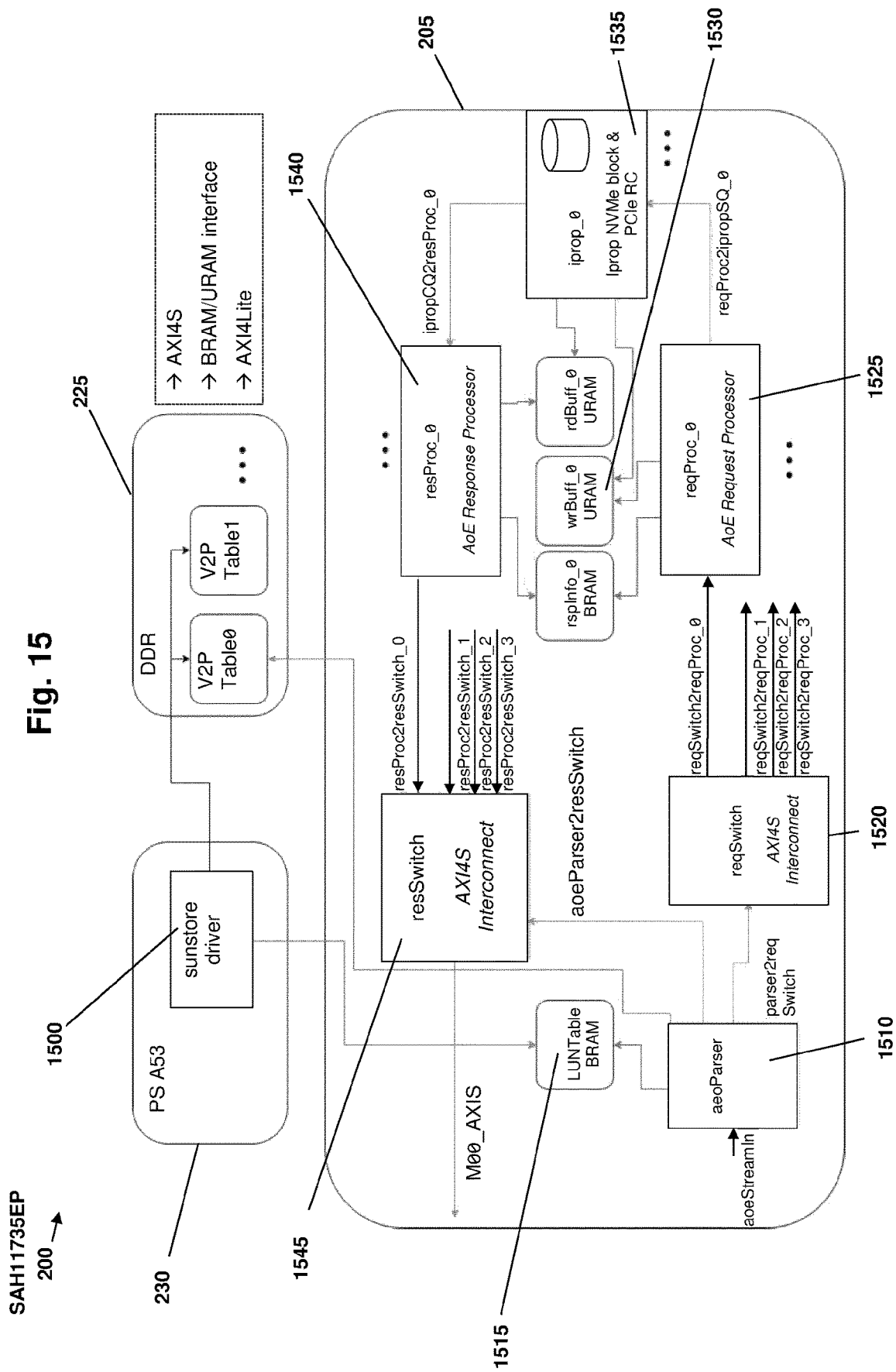
FIG. 15 is a block diagram setting out a detailed configuration for the storage controller of FIG. 2, according to an embodiment.

In step 605, storage controller 200 stores the data payload in a high speed memory of the storage controller (e.g. wrBuff, FIG. 15).

In step 610, storage controller 200 creates a WRITE request that includes the block address, the block size and a pointer to the location of the data payload in the storage controller memory. Depending on the format, the WRITE request may also specify that it is a WRITE request, to enable a recipient volume controller to determine the command type. The WRITE request can be in any format that is interpretable by a volume controller, e.g. volume controller 125*a*, that is coupled to the storage device, e.g. storage device 110*a*, that is relevant to the WRITE request. An exemplary format for the WRITE request is the ATA format known in the art per se.

Following creation of the WRITE request, in step 615 storage controller 200 transmits the WRITE request to a volume controller that is associated with the logical unit corresponding to the LUN identified by the destination address extracted in step 600.

Storage controller 200 processes the WRITE request in a conventional matter and in step 620, storage controller 200 receives a response to the WRITE request from the volume controller.

Steps 615 and 620 can also include the following operations: storage controller 200 stores a header of the WRITE request as an entry in a 'pending request' list or table that may be stored in memory. When the volume controller has finished servicing the WRITE request, it may update the entry in the pending request list/table by invoking an interrupt or mark completion of the request in a descriptor that points to the entry. Detection of this change can signify to storage controller 200 that the WRITE request has been serviced.

Upon receipt of the response, storage controller 200 checks whether any error has been returned in the response. In the event that an error has been returned, storage controller 200 proceeds to step 625 in which it generates and sends a packet with an appropriate error response.

In the event that an error has not been returned, storage controller 200 proceeds to step 630 and creates a response packet indicating that the WRITE operation was successful. Storage controller 200 then transmits the response packet to client device 115 via network 120 (step 635).

Optionally, after step 630 or after step 635, storage controller 200 may deallocate the space in the memory used to store the data payload. Space used to store the response packet may also be deallocated. This deallocation may reduce latency of subsequent operations because it frees up space in memory as soon as it is possible to do so, enabling this space to be re-used by a subsequent operation, e.g. a subsequent READ or WRITE request.

Copy

The COPY command includes a mechanism for reading data from a first location in a storage network and writing the data to a second location in the storage network. The first and second locations could be associated with the same logical unit, but different virtual or physical block addresses, or the first and second locations could be associated with different logical units. The COPY operation has utility, for example, in the synchronisation of a system employing drive replication and having a slave logical unit with a corresponding live or master logical unit. In this case the COPY command acts as a READ command in respect of the live or master logical unit and a WRITE command in respect of the slave logical unit, enabling resynchronisation between master and slave following slave downtime. Other uses for the COPY command will be apparent to a person skilled in the art.

The COPY command enables storage controller 200 to process both the read and write aspects of this operation without further input from client device 115. Specifically, client device 115 instructs the copy operation and receives a response from storage controller 200 either when the copy operation has been completed successfully or an error response to indicate failure of the copy operation. This requires network 120 to be traversed twice, once for the copy request and once for the copy response. Notably, the data payload itself does not need to be transmitted over network 120. The processing load on client device 115 is thus minimal, and latencies are typically relatively low.

On the other hand, prior art operations of this nature require client device 115 to firstly obtain the data from the storage layer via a read operation and secondly instruct a write of this data to the desired location in the storage layer via a write operation. Client device 115 thus bears the processing burden for handling both the read and write requests, and the latency of the total process can be overly high. The relatively high latency can be caused by the need to traverse network 120 four times (read request, read confirmation with payload, write request with payload, write confirmation) and/or delays in the processing of the read response and generating the write request by client device 115. The former is particularly important where relatively large quantities of data are being read and written. The COPY command described herein can therefore reduce network traversals by 50%, with a corresponding significant reduction in latency.

In addition, as storage controller 210 processes the COPY command in hardware using the logic paths discussed above, the component read and write operations are typically constructed and completed with lower latency than if client device 115 were responsible for handling the command generation.

The following packet structure can be used for the COPY command. The structures ethhdr and aoehdr are standard, the structure aoeata is new and described above in relation to the READ command, and the structure aoexata is also new and is described below. Note that this packet includes both a new aoexata_write structure, for the WRITE MIR- ROR command discussed in the next section, and a new aoexata_copy structure, for the COPY command discussed in this section.

```
struct aoexata {
    struct aoeata ata;
    union {
        u64 reserved[16];
        struct aoexata_write {
            u64 chkpnt;
            struct ethhdr eth
            struct aoehdr aoe;
            union {
                u64 val;
                u8 ary[6];
            } lba;
            u64 reserved[11];
        }_attribute_ ((packed));
        struct aoexata_copy {
            u64 chkpnt;
            u8 fwmac[6];
            u16 fwshelf;
            u8 fwslot;
            u8 flags
            u8 pad[6];
            u64 reserved[13];
        }_attribute_ ((packed));
    } cmd_header
}_attribute_ ((packed));
``` chkpnt is unused in respect of the COPY command, but is used in respect of the WRITE MIRROR command discussed below. fwmac is the MAC address of the target logical unit, fwshelf is the shelf of the target logical unit and fwslot is the slot of the target logical unit. aoeata. cmd_stat is set to AOE_ATA_COPY in this case to indicate to storage controller 200 that the packet encodes a COPY command.

In the context of the COPY command, the target logical unit is understood to be the logical unit that data is to be written to, which may be a slave logical unit in the case of systems employing logical unit replication. The reserved field within the aoexata_copy structure is used to encode a WRITE request that is generated by storage controller 210 as part of the COPY operation, and pad increases the total size of the aoexata_copy structure to the desired 128 bytes. The pad field could be shortened by replacing part of it with one or more additional fields, or removed entirely and replaced by one or more additional fields totaling 128 bytes. The pad field thus reserves space for future operations.

It will be apparent to those skilled in the art how the COPY command enables data to be copied from a first location to a second location. The COPY command is initially targeted at the logical unit containing the data that is to be copied via the major and minor fields in the standard AoE header aoehdr. As described above in connection with the READ command, successful completion of the READ operation returns the data read as a payload of the read response. However, instead of returning the payload to client device 115, storage controller 200 proceeds to generate a WRITE command using the information encoded in the COPY command header so as to write this data to another location specified by values in the fwmac, fwshelf and fwslot fields. Client device 115 can thus instruct the COPY operation and have nothing further to process other than the response from storage controller 200 indicating success or failure of the COPY command.

It will be appreciated that the invention is not restricted to the specific structure of the COPY command described above. Significant variation is possible.

Figure 7A:
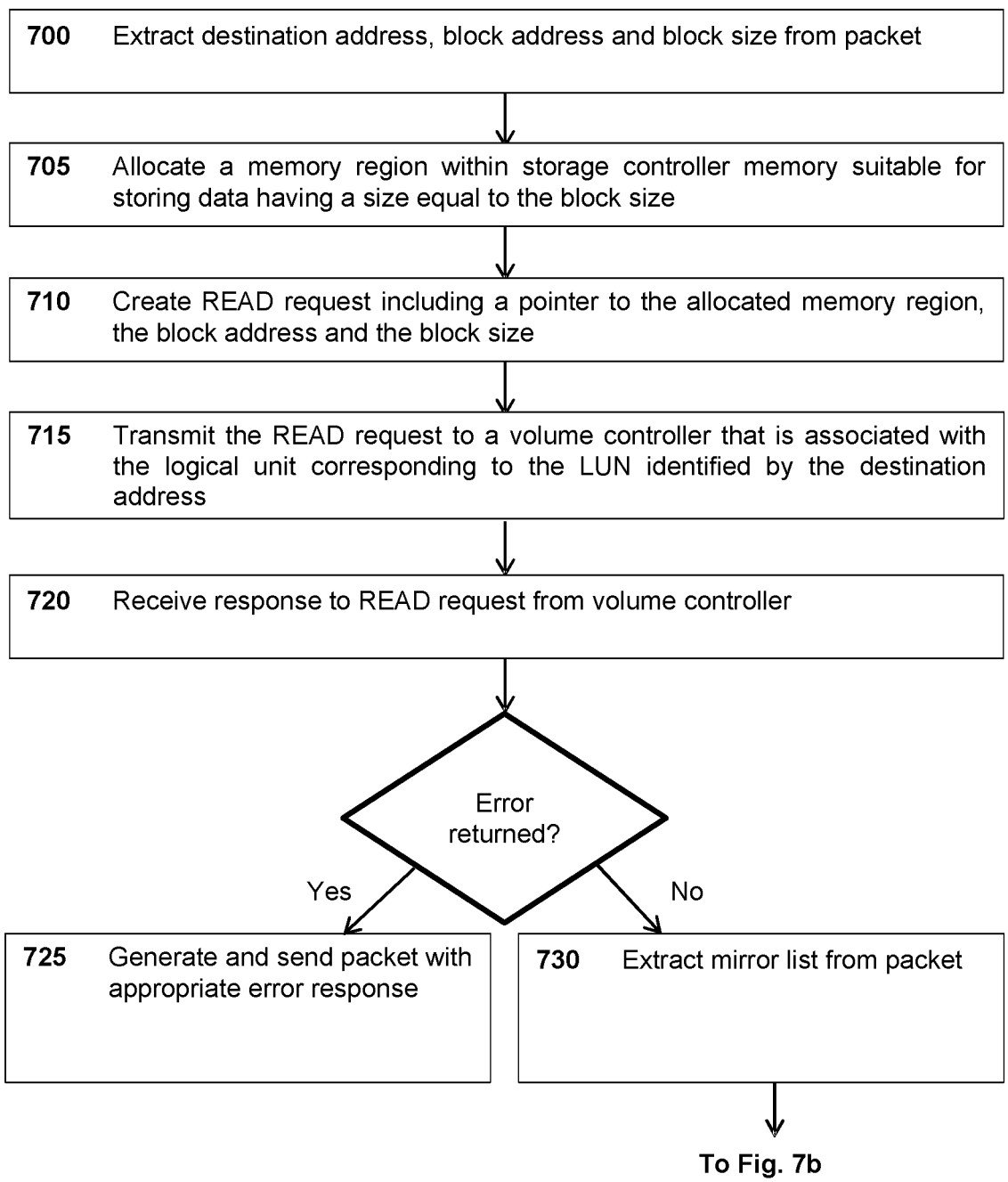
FIGS. 7a and 7b are flow diagrams illustrating a COPY command that may be performed by the storage controller of FIG. 2, according to an embodiment.
Figure 7B:
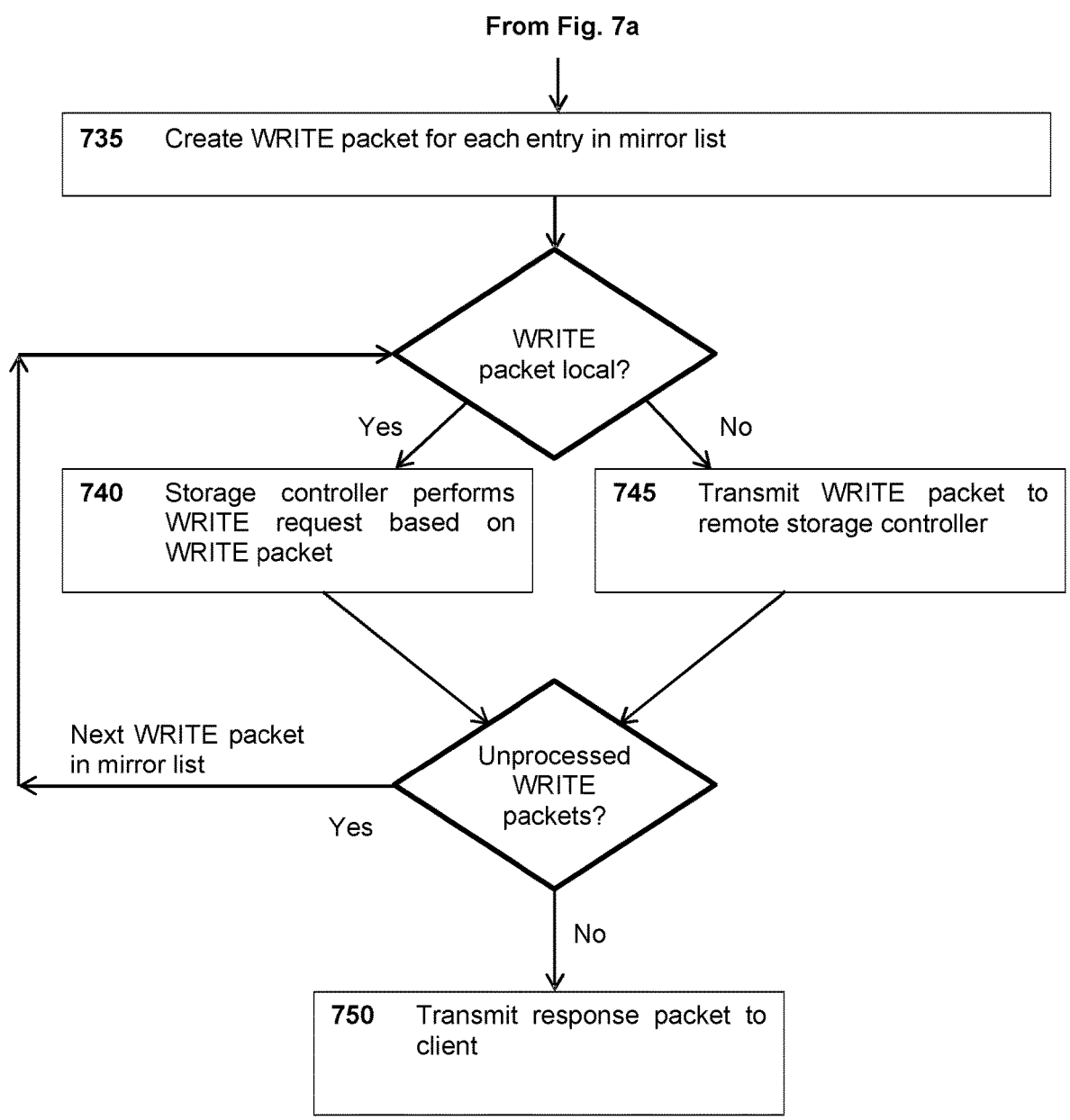

Storage controller 200 can process a COPY command via the method illustrated in FIGS. 7a and 7b and described in the following. The method of FIGS. 7a and 7b can be performed as part of step 320 of FIG. 3. In this case, the identification performed in step 305 has determined that the packet received in step 300 contains a COPY command and storage controller 200 has selected a corresponding COPY logic path for execution of the COPY command. Thus, the method of FIG. 5 can be performed by a COPY logic path of storage controller 200.

In step 700, storage controller 200 extracts a destination address, a block address and a block size from the packet. The destination address specifies a logical unit having an associated logical unit number, LUN. The destination address may be converted into a LUN using a LUN table, which may be stored in a high speed memory of the storage controller (e.g. BRAM 1515, FIG. 15). In the event that a LUN corresponding to the destination address specified in the packet cannot be found, storage controller 200 may abort the COPY operation and return an error, e.g. an input-output response error that indicates that the LUN could not be found.

The destination address, block address and block size enable storage controller 200 to determine a target LUN and a target storage range associated with this LUN, where the storage range starts at the block address and extends over a number of block addresses equal to the block size. The logical unit corresponding to the LUN may be a virtual logical unit, in which case the block address is a virtual block address.

In the case of the AoE packet discussed above, the block address can be contained in the lba field, the block size can be contained in the count field and the destination address can be contained in the major and minor fields. As part of step 700, storage controller 200 may be configured to look up the shelf and slot values respectively contained in the major and minor fields in the LUN table. The LUN table may include a set of LUNs identifiable by shelf and slot number, enabling storage controller 200 to convert a pair of values <shelf, slot> into a LUN.

In step 705, storage controller 200 allocates a memory region within a high speed memory module (e.g. rdBuff, FIG. 15) that is suitable for storing data having a size equal to the block size. This memory region will temporarily hold the data read from the storage layer, before it is written to one or more further locations within the storage layer.

In step 710, storage controller 200 creates a READ request that includes a pointer to the allocated memory region, the block address and the block size. Depending on the format, the READ request may also specify that it is a READ request, to enable a recipient volume controller to determine the command type. The READ request can be in any format that is interpretable by a volume controller, e.g. volume controller 125a, that is coupled to the storage device, e.g. storage device 110a, that is relevant to the READ request. An exemplary format for the READ request is the ATA format known in the art per se.

Following creation of the READ request, in step 715 storage controller 200 transmits the READ request to a volume controller that is associated with the logical unit corresponding to the LUN identified by the destination address extracted in step 700.

Storage controller 200 processes the READ request in a conventional matter and in step 720, storage controller 200 receives a response to the READ request from the volume controller.

Steps 715 and 720 can also include the following operations: storage controller 200 stores a header of the READ request as an entry in a 'pending request' list or table that may be stored in memory. When the volume controller has finished servicing the READ request, it may update the entry in the pending request list/table by invoking an interrupt or mark completion of the request in a descriptor that points to the entry. Detection of this change can signify to storage controller 200 that the READ request has been serviced.

Upon receipt of the response, storage controller 200 checks whether any error has been returned in the response. In the event that an error has been returned, storage controller 200 proceeds to step 725 in which it generates and sends a packet with an appropriate error response to client device 115.

In the event that an error has not been returned, storage controller 200 proceeds to step 730 and extracts a mirror list from the packet. The mirror list comprises one or more destination addresses specifying a respective one or more mirror logical units having respective mirror LUNs. In an implementation making use of AoE, address details of the mirror logical unit(s) can be stored in the fwmac, fwshelf and fwslot fields of the aoexata packet structure disclosed above, respectively, a MAC address, shelf and slot of the or each mirror LUN. In the case of multiple mirror logical units, an array of struct aoexata_copy can be provided, where each element of the array contains address details of a different one of the multiple mirror logical units.

In step 735, storage controller 200 creates a WRITE packet for each entry in the mirror list. Each WRITE packet includes a destination address in its packet header set equal to a respective one of the destination addresses in the mirror list. Each WRITE packet also includes a data payload comprising the contents of the memory region allocated in step 705, i.e. the data retrieved from the storage layer as part of the READ request.

Storage controller 200 then determines whether the destination address for each WRITE packet is local to the storage controller 200 or not. In the event the destination address is local to storage controller 200, for that WRITE packet storage controller 200 performs step 740 and performs a WRITE request based on that WRITE packet. The WRITE operation may be performed in accordance with FIG. 6.

In the case where the destination address is not local to storage controller 200, packet storage controller 200 transmits that WRITE packet to a remote storage controller corresponding to the destination address of that WRITE packet. Upon receipt of the WRITE packet, the remote storage controller can perform a WRITE operation as described in accordance with FIG. 6.

Upon completion of step 740 or step 745, storage controller 200 can determine whether any WRITE packets on the mirror list remain unprocessed. In the case where at unprocessed WRITE packets exist, step 740 or 745 can be repeated for each unprocessed entry in the mirror list. In the case where all WRITE packets created in step 735 have been processed, storage controller 200 can transmit a response packet to client 115 indicating success or failure of the COPY command.

Optionally, after step 750, storage controller 200 may deallocate the space in memory used to store the data read from the storage layer in step 720. Space used to store the response packet may also be deallocated. This deallocation may reduce latency of subsequent operations because it frees up space in the memory as soon as it is possible to do so, enabling this space to be re-used by a subsequent operation, e.g. a new READ request.

It will be appreciated that the mirror list specifies a set of logical units for which the data read in steps 710 to 725 is to be written. The result of the COPY command is thus that the data read in steps 710 to 725 is written to each location included on the mirror list. Advantageously, client device 115 does not need to handle this set of write operations directly—instead, the writes are all handled by storage controller 200. This reduces latency and also decreases the processing load for client device 115.

Write Mirror

The WRITE MIRROR command enables client device 115 to specify additional target(s) for data to be written to. Advantageously, this means that client device 115 need only transmit one instance of the WRITE MIRROR command to achieve data writes to N different locations, where N is an integer greater than 1. This results in two traversals of network 120, once for client device 115 to instruct storage controller 200 to perform the WRITE MIRROR operation and once for storage controller 200 to provide a response to the WRITE MIRROR request (e.g. indicate success or failure). The data to be written need only be transmitted once over network 120 as a payload appended to the WRITE MIRROR command packet.

In contrast, prior art techniques require a client device to instruct N distinct write operations in the case where N locations are to store a particular data package. This results in 2N traversals over network 120, N of which contain the data payload. Compared with this, the WRITE MIRROR command transmits around $$\frac{1}{N} \times 100\%$$

of the data transmitted over network 120 necessary to achieve the same number of writes using a prior art system. Notably the data payload, which is typically significantly larger than the packet headers, is transmitted only once rather than N times. Any increase in packet header size caused by implementing the present invention is thus more than offset by the fact that the data payload is transmitted N−1 fewer times over network 120. As latencies over network 120 are typically significantly greater than those within a storage area network itself, fewer traversals over network 120 owing to the WRITE MIRROR command can significantly reduce latency for writes of the same data to multiple locations compared with prior art systems.

In addition, the present invention offloads handling of the multiple write operations from client device 115 to storage controller 200. This reduces the processing load on client device 115. Furthermore, as storage controller 200 processes the WRITE MIRROR command in hardware using the input-output logic paths discussed above, the component read and write operations are typically constructed and completed with lower latency than if client device 115 were responsible for handling the command generation.

The following packet structure can be used for the WRITE MIRROR command. The structures ethhdr and aoehdr are standard, the structure aoeata is new and described above in relation to the READ command, and the structure aoexata is also new and is described below. Note that this packet includes both a new aoexata_write structure, for the WRITE MIRROR command discussed in this section, and a new aoexata_copy structure, for the COPY command discussed in the immediately preceding section.

```
struct aoexata {
    struct aoeata ata;
    union {
        u64 reserved[16];
        struct aoexata_write {
            u64 chkpnt;
            struct ethhdr eth
            struct aoehdr aoe;
            union {
                u64 val;
                u8 ary[6];
            } lba;
            u64 reserved[11];
        } _attribute_ ((packed));
        struct aoexata_copy {
            u64 chkpnt;
            u8 fwmac[6];
            u16 fwshelf;
            u8fwslot;
            u8 flags
            u8 pad[6];
            u64 reserved[13];
        }attribute ((packed));
    } cmd_header
}_attribute_ ((packed));
``` chkpnt is a checkpoint number that is sent to each mirror separately in order to keep the data in the mirrors synchronised and to help detect any write failures or a mirror going offline. An offline mirror will cease generating sequence numbers, meaning that when the mirror comes online again the sequence number will not match with other mirror(s) that remained online. Remedial action can be taken based on the sequence number discrepancy between mirrors. The reserved space is padding.

It will be appreciated that storage controller 200 can generate as many copies of a WRITE command as are necessary to write the payload to each desired location. In this way, responsibility for processing the further write commands can be offloaded from client device 115 to storage controller 200. aoeata. cmd_stat is set to AOE_ATA_WRITE and aoehdr.cmd is set to AOE_CMD_XATA to indicate to storage controller 200 that the packet encodes a WRITE MIRROR command.

The aoeata. cmd_stat field can be used to indicate whether an aoexata formatted packet instructs a WRITE MIRROR or COPY request. Suitable values for this field to achieve this will be apparent to the skilled person having the benefit of the present disclosure.

Figure 8A:
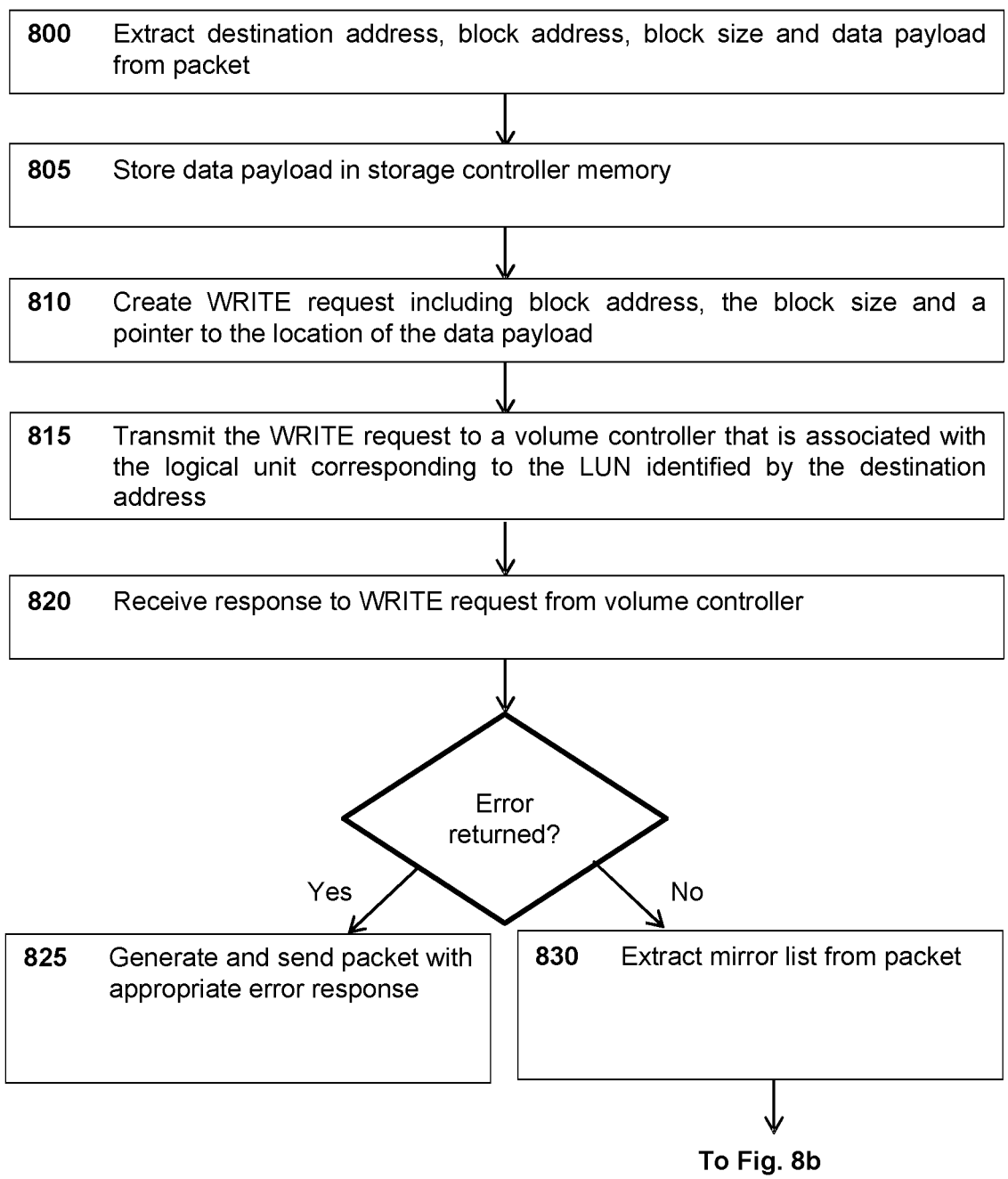

Storage controller 200 can process a WRITE MIRROR command via the method illustrated in FIG. 8 and described in the following. The method of FIG. 8 can be performed as part of step 320 of FIG. 3. In this case, the identification performed in step 305 has determined that the packet received in step 300 contains a WRITE MIRROR command and storage controller 200 has selected a corresponding input-output logic path for execution of the WRITE MIRROR command.

In step 800, storage controller 200 extracts a destination address, a block address, a block size and a data payload from the packet. The destination address specifies a logical unit having an associated logical unit number, LUN. The destination address may be converted into a LUN using a LUN table, which may be stored in a high speed memory of the storage controller (e.g. BRAM 1515, FIG. 15). In the event that a LUN corresponding to the destination address specified in the packet cannot be found, storage controller 200 may abort the WRITE operation and return an error, e.g. an input-output response error that indicates that the LUN could not be found. The data payload is the data that is to be written to the storage layer, which data payload may have been provided by client device 115.

The destination address, block address and block size enable storage controller 200 to determine a target LUN and a target storage range associated with this LUN, where the storage range starts at the block address and extends over a number of addresses equal to the block size. The logical unit corresponding to the LUN may be a virtual logical unit, in which case the block address is a virtual block address.

In the case of the AoE packet discussed above, the block address can be contained in the lba field, the block size can be contained in the count field and the destination address can be contained in the major and minor fields. As part of step 800, storage controller 200 may be configured to look up the shelf and slot values respectively contained in the major and minor fields in a LUN table stored in a high speed memory of the storage controller. The LUN table may include a set of LUNs identifiable by shelf and slot number, enabling storage controller 200 to convert a pair of values <shelf, slot> into a LUN. The block size corresponds to the size of the data payload.

In step 805, storage controller 200 stores the data payload in storage controller memory (e.g. wrBuff, FIG. 15).

In step 810, storage controller 200 creates a WRITE request that includes the block address, the block size and a pointer to the location of the data payload in the storage controller memory. Depending on the format, the WRITE request may also specify that it is a WRITE request, to enable a recipient volume controller to determine the command type. The WRITE request can be in any format that is interpretable by a volume controller, e.g. volume controller 125a, that is coupled to the storage device, e.g. storage device 110a, that is relevant to the WRITE request. An exemplary format for the WRITE request is the ATA format known in the art per se.

Following creation of the WRITE request, in step 815 storage controller 200 transmits the WRITE request to a volume controller that is associated with the logical unit corresponding to the LUN identified by the destination address extracted in step 600.

Storage controller 200 processes the WRITE request in a conventional matter and in step 820, storage controller 200 receives a response to the WRITE request from the volume controller.

Steps 815 and 820 can also include the following operations: storage controller 200 stores a header of the WRITE request as an entry in a 'pending request' list or table that may be stored in memory. When the volume controller has finished servicing the WRITE request, it may update the entry in the pending request list/table by invoking an interrupt or mark completion of the request in a descriptor that points to the entry. Detection of this change can signify to storage controller 200 that the WRITE request has been serviced.

Upon receipt of the response, storage controller 200 checks whether any error has been returned in the response. In the event that an error has been returned, storage controller 200 proceeds to step 825 in which it generates and sends a packet with an appropriate error response.

In the event that an error has not been returned, storage controller 200 proceeds to step 830 and extracts a mirror list from the packet. The mirror list comprises one or more destination addresses specifying a respective one or more mirror logical units having respective mirror LUNs. In an implementation making use of AoE, address details of the mirror logical unit(s) can be stored in the ethhdr field and aoehdr field of the aoexata_write structure in the aoexata packet disclosed above.

In step 835, storage controller 200 creates a WRITE packet for each entry in the mirror list. Each WRITE packet includes a destination address in its packet header set equal to a respective one of the destination addresses in the mirror list. Each WRITE packet also includes a data payload comprising the data payload stored in the storage controller memory in step 805.

Storage controller 200 then determines whether the destination address for each WRITE packet is local to the storage controller 200 or not. In the event the destination address is local to storage controller 200, for that WRITE packet storage controller 200 performs step 840 and performs a WRITE request based on that WRITE packet. The WRITE operation may be performed in accordance with FIG. 6.

In the case where the destination address is not local to storage controller 200, n step 845 storage controller 200 transmits that WRITE packet to a remote storage controller corresponding to the destination address of that WRITE packet. Upon receipt of the WRITE packet, the remote storage controller can perform a WRITE operation as described in accordance with FIG. 6.

Upon completion of step 840 or step 845, storage controller 200 can determine whether any WRITE packets on the mirror list remain unprocessed. In the case where at unprocessed WRITE packets exist, step 840 or 845 can be repeated for each unprocessed entry in the mirror list. In the case where all WRITE packets created in step 835 have been processed, in step 850 storage controller 200 can transmit a response packet to client 115 indicating success or failure of the WRITE MIRROR command.

Optionally, after step 850, storage controller 200 may deallocate the space in memory used to store the data payload. Space used to store the response packet may also be deallocated. This deallocation may reduce latency of subsequent operations because it frees up space in the memory as soon as it is possible to do so, enabling this space to be re-used by a subsequent operation, e.g. a new WRITE request.

It will be appreciated that the mirror list specifies a set of logical units for which the data payload is to be written. The result of the WRITE MIRROR command is thus that the data payload is written to each location included on the mirror list. Advantageously, client device 115 does not need to handle this set of write operations directly—instead, the writes are all handled by storage controller 200. This reduces latency and also decreases the processing load for client device 115.

The table below summarises the various commands supported by the framework implemented by the present invention.

Virtual LUN Table

Storage controller 200 can natively support virtualisation by being configured to translate a virtual storage region of a virtual logical unit starting at a virtual block address and having a size equal to a specified block size to a physical storage region of a physical LUN, the physical storage region starting at a physical storage address and having a size equal to the same specified block size. This configuration advantageously enables storage controller 200 to provide a virtual storage management overlay function in addition to handling input-output requests. This can further reduce client device processing load as the translation between physical and virtual storage blocks is handled by storage controller 200. Additionally, this translation can be handled via a logic path of storage controller 200, meaning that it is handled rapidly (e.g. at or near line rate). Furthermore, since the physical storage region is invisible to client devices, the virtual LUN table enables a single storage device to be shared among multiple clients without causing any disruption to of any of said clients. Equally, a virtual logical unit assigned to a particular client can span more than one storage device, again in a manner invisible to the client.

The mapping between virtual and physical block addresses can be performed by storage controller 200 using a virtual LUN table and a block address translation table. The virtual LUN table and block address translation table can be implemented in connection with any aspect of the invention described above. In the case of each command described above, the destination address in a packet inbound to storage controller 200 can specify a virtual block address associated with a virtual logical unit having a corresponding virtual LUN. In the case of the COPY and WRITE MIRROR commands having an associated mirror list, each entry in the mirror list can also specify a virtual block address.

Figure 9:
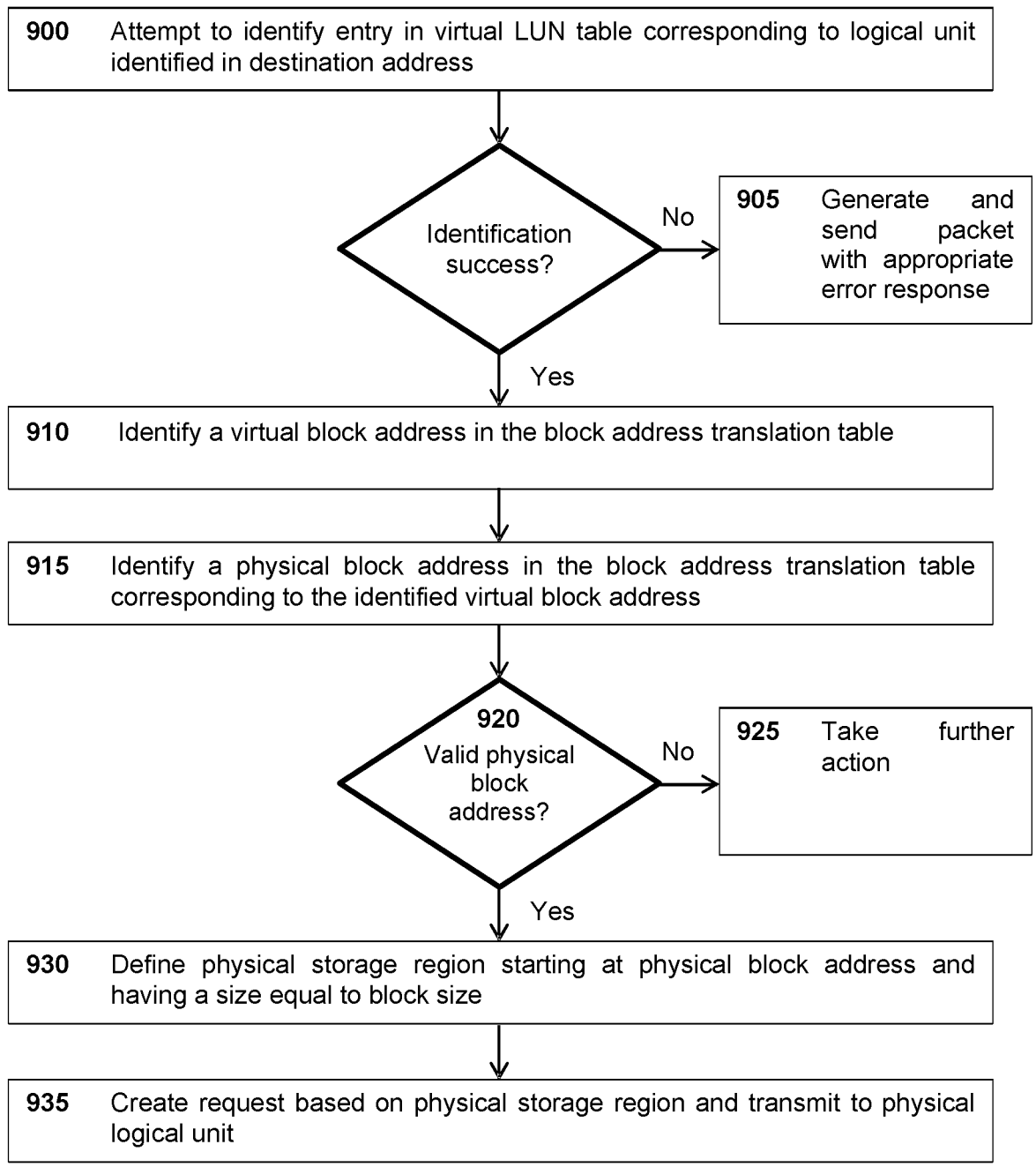
FIG. 9 is a flow diagram illustrating a process by which the storage controller of FIG. 2 can translate a virtual block address to a physical block address using a virtual LUN table and a block address translation table, according to an embodiment.

FIG. 9 shows a process by which storage controller 200 can translate a virtual block address to a physical block address using a virtual LUN table and a block address translation table. Exemplary formats for each table are shown in FIGS. 10*a* and 10*b*. The process of FIG. 9 can be implemented as part of step 320 of FIG. 3. More specifically, conversion from a virtual block address to a physical block address using the virtual LUN table can be performed as part of step 510 of FIG. 5, step 610 of FIG. 6, step 710 of FIG. 7*a*, and step 810 of FIG. 8*a*.

In step 900, storage controller 200 attempts to identify an entry in the virtual LUN table (FIG. 10*a*) corresponding to the logical unit identified in the destination address specified in the packet received from client device 115. If no entry can be identified, the destination address is treated as invalid and in step 905 storage controller 200 generates and sends a packet to client device with an appropriate error response.

In the event an entry is identified, in step 910 storage controller 200 identifies a virtual block address in the block address translation table that is referenced by a pointer in the entry in the virtual LUN table identified in step 900.

| aoehdr.cmd | aoeata.cmd_stat | Other | Command type |
|---|---|---|---|
| AOE_CMD_ATA | AOE_ATA_READ | aoeata.count ≠ 0 | READ |
| AOE_CMD_ATA | AOE_ATA_READ | aoeata.count == 0 | Keep-alive request |
| AOE_CMD_ATA | AOE_ATA_WRITE | aoeata.count ≠ 0 | WRITE |
| AOE_CMD_ATA | AOE_ATA_WRITE | aoeata.count == 0 | CHECKPOINT |
| AOE_CMD_CONFIG | n/a | n/a | CONFIG |
| AOE_CMD_XATA | AOE_ATA_COPY | n/a | COPY |
| AOE_CMD_XATA | AOE_ATA_WRITE | n/a | WRITE MIRROR |

In step 915, storage controller 200 identifies a physical block address in the block address translation table corresponding to the virtual block address identified in step 920.

Optionally, in step 920 storage controller 200 determines whether the identified physical block address is valid. Valid physical block addresses are discussed below. In the event the physical block address is invalid, storage controller 200 takes further action (step 925). The action taken can depend on the nature of the command instructed by client device 115. For example, in the case of a READ command, storage controller 200 can generate and send a response packet to client device 115 indicating that no data could be read. In the case of a WRITE command, storage controller 200 can forward the packet received from client device 115 to processor 230, on the understanding that processor 230 will handle the mapping of the virtual block address to a physical block address and update the virtual LUN table accordingly.

In step 930, storage controller 200 defines a physical storage region starting at the physical block address and having a size equal to the specified block size. This physical storage region is where the data pertaining to the request from client device 115 is either stored in the case of a READ request or to be written in the case of a WRITE request. Having established the physical storage region, storage controller 200 is now in a position to create an appropriate request and transmit this to a volume controller associated with the relevant physical logical unit (step 935).

An exemplary virtual LUN table is shown in FIG. 10a and an exemplary block address translation table is shown in FIG. 10b. It will be appreciated that, although these tables are shown as separate entities, this is not essential and these tables may be combined into a single entity, or further divided into three or more tables, without departing from the scope of the invention.

Each table may be stored in a high speed internal memory of storage controller 200. This high speed internal memory is separate from memory 225 and may be, for example, a Block RAM (BRAM) or UltraRAM (URAM) memory module comprised of integrated circuits. Such high speed memory modules typically have relatively limited storage capacity, and in recognition of this fact the tables of FIGS. 10a and 10b are defined in a manner that advantageously minimises the amount of memory required to store each table. FIG. 15 provides an exemplary configuration in which such storage is implemented.

FIG. 10a shows a virtual LUN table suitable for use in connection with the method of FIG. 9. The virtual LUN table contains one entry per virtual logical unit.

The virtual LUN table includes a virtual LUN index that uniquely identifies the virtual logical unit. In the context of an AoE packet, the virtual LUN index can be a combination of the major and minor values, which hold the logical unit shelf and slot numbers.

The virtual LUN table also includes a virtual LUN size for each virtual logical unit defined within the virtual LUN table. The virtual LUN size is specified as a positive integer multiple of a constant chunk size, the constant being an integer specifying a basic unit of memory having a basic memory size. In the illustrated example the constant chunk size is set equal to 16 MB (16,777,216 bytes), so that the size of each virtual logical unit is specified in the virtual LUN table as some positive integral multiple of 16 MB. The value of this constant may be stored in the high speed internal memory of storage controller 200. It will be appreciated that the constant can take any positive integer value, hence deviations from 16 Mb are also within the scope of the present invention.

The virtual LUN table further includes, for each virtual logical unit in the virtual LUN table, a pointer to a start virtual block address in the block address translation table (FIG. 10b), the start virtual block address defining a start of a virtual storage region allocated to the respective virtual logical unit. In FIG. 10a, pointers have been indicated via the asterisk symbol.

The following exemplary structure can be used to define the virtual LUN table.

```
u32 chunk_size_bytes = 16777216;
struct luntbl_t {
    unsigned int:24 nr_chunks;
    u16 v2p_tbl_ptr;
} _attribute_ ((packed));
struct luntbl_t luntable[65536];
``` chunk_size_bytes specifies the basic unit of storage, which in this case is 16 Mb. This can be referred to as a 'chunk' of storage. nr_chunks specifies a number of chunks, i.e. the virtual logical unit size, as a multiple of the basic unit of storage stored in chunk_size_bytes. v2p_tbl_ptr is a pointer to the start block address within the block address translation table (FIG. 10b) for a given virtual logical unit.

The example above is provided in the context of an AoE packet environment, in which the major field holds 16 bit values. This enables a maximum of 65,536 virtual LUN indexes (64 kB). The structure above requires 5 bytes per entry, resulting in a total size of 320 kB for the virtual LUN table, i.e. a relatively small memory requirement.

FIG. 10b shows a block address translation table suitable for use in connection with the method of FIG. 9. Note: ellipses in FIG. 10b denote further block addresses that are not shown in the interests of brevity. The block address translation table is preferably stored in the high speed memory of storage controller 200.

The block address translation table contains virtual block addresses and corresponding physical block addresses, enabling the mapping between virtual and physical block addresses to be captured. This enables a virtual block address to be converted into a corresponding physical block address, which physical block address can be used, e.g. by volume controller 125a, 125b, to extract data from the storage layer.

In order to minimise the size of the block address translation table, instead of mapping each virtual block address to a corresponding physical block address, the block address translation table preferably increments virtual and physical block addresses by a constant amount equal to a basic unit of storage having a basic storage size. This constant value can be set equal to the basic unit of storage defined in respect of the virtual LUN table, e.g. 16 MB in the example above, this being the value of chunk_size_bytes. This is however not essential and the basic unit of storage defined in respect of the block address translation table can take a different value to the basic unit of storage defined in respect of the LUN table.

The following exemplary structure can be used to define the block address translation table.

```
struct v2ptbl_t {
    u32 phys_chunk_addr;
} _attribute_ ((packed));
struct v2ptbl_t v2ptable[luntbl_t.nr_chunks];
```

The field phys_chunk_addr contains a physical block address corresponding to the start of a chunk of physical storage having a size equal to the basic block size.

The structure v2ptable is indexed by virtual block addresses spaced apart by the basic block size. The result is shown in FIG. 10b where adjacent virtual block addresses are offset by 16 MB and adjacent virtual block addresses are also offset by 16 MB. The result is a mapping between virtual storage chunks and physical storage chunks.

In cases where the virtual block addresses are mapped in chunks, the number of entries in the block address translation table is reduced to a size of $$\frac{1}{\text{chunk size}}$$

compared to a table containing every virtual block address. This results in a corresponding reduction in the amount of memory required to store the block address translation table. This may assist in fitting the block address translation table into the high speed internal memory of storage controller 200, with associated reduction in latency.

Unallocated virtual storage chunks can be mapped to a zero value entry in the physical block address field. It will be appreciated that use of zero is not essential to this aspect of the invention, as any other value that is readily identifiable as being an invalid physical block address can be used instead. Alternatively, a particular value may be reserved as indicating an unallocated physical block address.

Mappings between virtual and physical block addresses can be created by processor 230; this is an example of a control instruction that can be forwarded to processor 230 using the FWD_TO_CPU logic path of storage controller 200.

If implementing a virtual LUN table, storage controller 200 can be configured to detect an attempt to read unallocated virtual block addresses by identifying that the block address translation table contains an invalid value in the corresponding physical block address field.

Storage controller 200 can be configured to respond to a READ request referencing an unallocated virtual block address by generating a response packet having no data payload, thus indicating that it was not possible to read any data from the storage layer. This response can be generated based on the lack of a valid mapping of the virtual block address in the block address translation table, the storage layer does not need to be involved. Thus, through use of the virtual LUN table, storage controller 200 does not need to contact the storage layer to determine that the virtual block address is unallocated, advantageously reducing latency.

Checkpoint

Earlier it was explained that a zero size WRITE command may be indicative of a CHECKPOINT command. Details of the CHECKPOINT command are provided below.

The purpose of the CHECKPOINT command is to establish a checkpoint. This is a moment in time at which it is understood that a set of logical units comprising two or more logical units specified in the CHECKPOINT command should be synchronised mirrors, i.e. containing identical sets of data. Checkpoints can be used to ensure that consistent copies of data are maintained across the set of mirrored logical units. This is desirable in situations where data redundancy is desirable, e.g. in a Redundant Array of Independent Disks (RAID) to provide availability and fault-tolerance.

Desynchronisation can occur through failure of a component within a storage network, where the component failure causes a particular logical unit to be unreachable for some time. For example, a particular disk within a set of mirror devices may be unreachable for some time owing to a fault. During this downtime, write operations performed in respect of a group of synchronised mirror logical units will not be implemented by the logical unit that is experiencing downtime, resulting in desynchronisation of the logical unit experiencing downtime.

Storage controller 200 can implement a write tracking table that enables write operations to be tracked. The write tracking table contains an entry for each of a plurality of blocks of a logical unit, and is updated by storage controller 200 on completion of a successful write operation in respect of a given block or set of blocks of the logical unit. The write tracking table thus records which blocks of a logical unit have been written to over a given time period. In the event of a failure or other event that causes a first logical unit to go offline, once the logical unit is back online the write tracking table associated with the first logical unit can be compared with a write tracking table associated with a second logical unit that the first logical unit is intended to be synchronised with. The write tracking table can be used to determine the minimum set of storage regions or blocks required to copy their data to the first logical unit, in order to make it consistent with the rest of the mirror logical units, enabling resynchronisation to occur relatively quickly and easily.

Figures 11, 12:
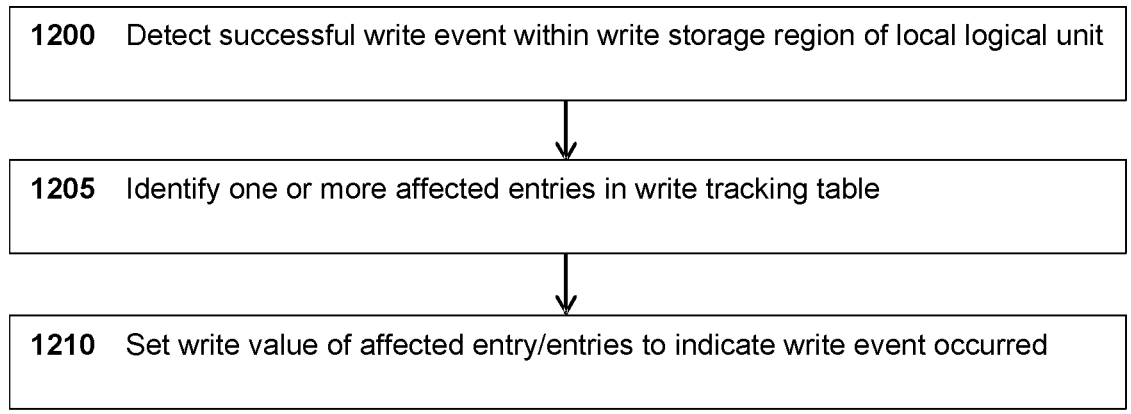
FIG. 11 is a graphical representation of a write tracking table according to an embodiment.
FIG. 12 is a flow diagram illustrating a process by which the storage controller of FIG. 2 can update the write tracking table of FIG. 11, according to an embodiment.

FIG. 11 illustrates a write tracking table according to the present invention. The write tracking table can be stored in a memory of storage controller 200, e.g. memory 225. The write tracking table is associated with a logical unit that is local to storage controller 200, where this local logical unit has an associated LUN. The write tracking table includes a header that contains the LUN, to enable storage controller 200 to identify which logical unit the write tracking table relates to.

Each entry of the write tracking table includes three values, as follows:

The first value is a unique index that uniquely identifies the entry within the write tracking table. The unique index can be assigned in any manner desired, and in the illustrated example it is an integer that is incremented by one for each adjacent entry.

The second value in a given entry of the write tracking table is a local logical unit block address, which value identifies a block address that is the start of a storage region. The size of the storage region is set by a constant that is also defined, where this constant is equal to a basic unit of storage having a basic storage size. In the illustrated example the constant is set equal to 64 KB, but this is not essential and other values for this constant can alternatively be used. The write tracking table thus tracks writes to the local logical unit as a level of granularity equal to the value of the constant. The number of entries in the write tracking table is equal to the size of the local logical unit divided by the constant.

In the case where the write tracking table is implemented in conjunction with the virtual LUN table, the following modified structure can be used:

```
u32 chunk_size_bytes = 16777216;
u32 extent_size = 64 * 1024
struct luntbl_t {
    unsigned int:24 nr_chunks;
    u16 v2p_tbl_ptr;
} _attribute_ ((packed));
struct luntbl_t luntable[65536];
```

Here, a constant extent_size is defined, where this constant is set equal to the basic unit of storage having the basic storage size (64 KB in this particular embodiment).

The third value in a given entry of the write tracking table is a write value. This value captures whether or not any part of the storage region corresponding to the given entry has been written to since receipt of the most recent CHECKPOINT command. The write value can be a Boolean value, and in the illustrated example a valid write value is either zero or one. Zero indicates that the storage region specified in the given entry has not been successfully written to since receipt of the most recent CHECKPOINT command and one indicates that the storage region specified in the given entry has been successfully written to at least once since receipt of the most recent CHECKPOINT command.

FIG. 12 shows a process by which storage controller 200 can update the write tracking table upon detection of a successful write operation to the local logical unit.

In step 1200, storage controller 200 detects a successful write event to the local logical unit, the write event occurring within a write storage region of the local logical unit. The write event can be as a result of receipt of a WRITE command as implemented in accordance with FIG. 6, for example.

In step 1205, storage controller 200 identifies one or more identified entries in the write tracking table. Each entry that is identified has a local logical unit storage region that encompasses at least one block address within the write storage region; that is, the identified entries have each been affected by the write event.

In step 1210, storage controller 200 sets the write value associated with each of the identified entries to indicate that a write event has occurred. In the exemplary form of the write tracking table shown in FIG. 11, the write value is set to 1 for each affected entry to signify that a write event has occurred within the corresponding storage region.

It will be appreciated that the write tracking table can be implemented in respect of a virtual logical unit, in which case the logical unit block address in the write tracking table is a virtual logical unit block address. The principles of write tracking explained above still apply in respect of a virtual logical unit. The virtual LUN table can be used to translate between a physical storage region that has been written to and a corresponding virtual storage region.

From time to time it is desirable to reset the write tracking table, e.g. upon confirmation of a successful synchronisation operation between two or more logical units. In order to reset the write tracking table, a CHECKPOINT command can be issued, e.g. via a zero size WRITE command as discussed above. It will be appreciated that the zero size WRITE command does not have to be used and that a separate CHECKPOINT command could alternatively be defined, if desired. The CHECKPOINT command is handled by processor 230 and is taken as an indicator that a new CHECKPOINT is to be established. To achieve this, processor 230 sets every write value in each affected write tracking table to indicate that a write event has not occurred, e.g. zeroing every write value in the write tracking table.

In order to resynchronise a first logical unit that has lost synchronisation with a second logical unit, the write tracking table of the second logical unit can be examined. Any entry of the write tracking table of the second logical unit that has a write value of one is indicative of one or more block writes to the corresponding region. Storage controller 200 can therefore copy the contents of any storage region of the second logical unit having a write value of one to the first logical unit, thereby restoring synchronisation. The write value of the affected entry in the write tracking table of the first logical unit can be updated after the copy operation has successfully completed so that the write tracking table accurately records that resynchronisation has occurred. The write tracking table advantageously enables storage controller 200 to resynchronise a logical unit with minimal input from client device 115, e.g. upon receipt of a COPY command from client device 115 that specifies the block(s) affected by downtime of a particular logical unit as identifiable from the comparison of the logical unit's write tracking table with the write tracking table of a master logical unit.

Snapshot

Storage controller 200 can also implement a SNAPSHOT command. The SNAPSHOT command is used to create a child virtual logical unit from a parent virtual logical unit, where the child virtual logical unit is identical to the parent virtual logical unit at the moment of creation. The purpose of the child virtual logical unit is to retain the state of the parent virtual logical unit as it was at the moment of creation of the child virtual logical unit, i.e. to retain a 'snapshot' of the parent virtual logical unit. This enables, for example, undo and restore type operations to be performed, should this become desirable.

Figure 13:
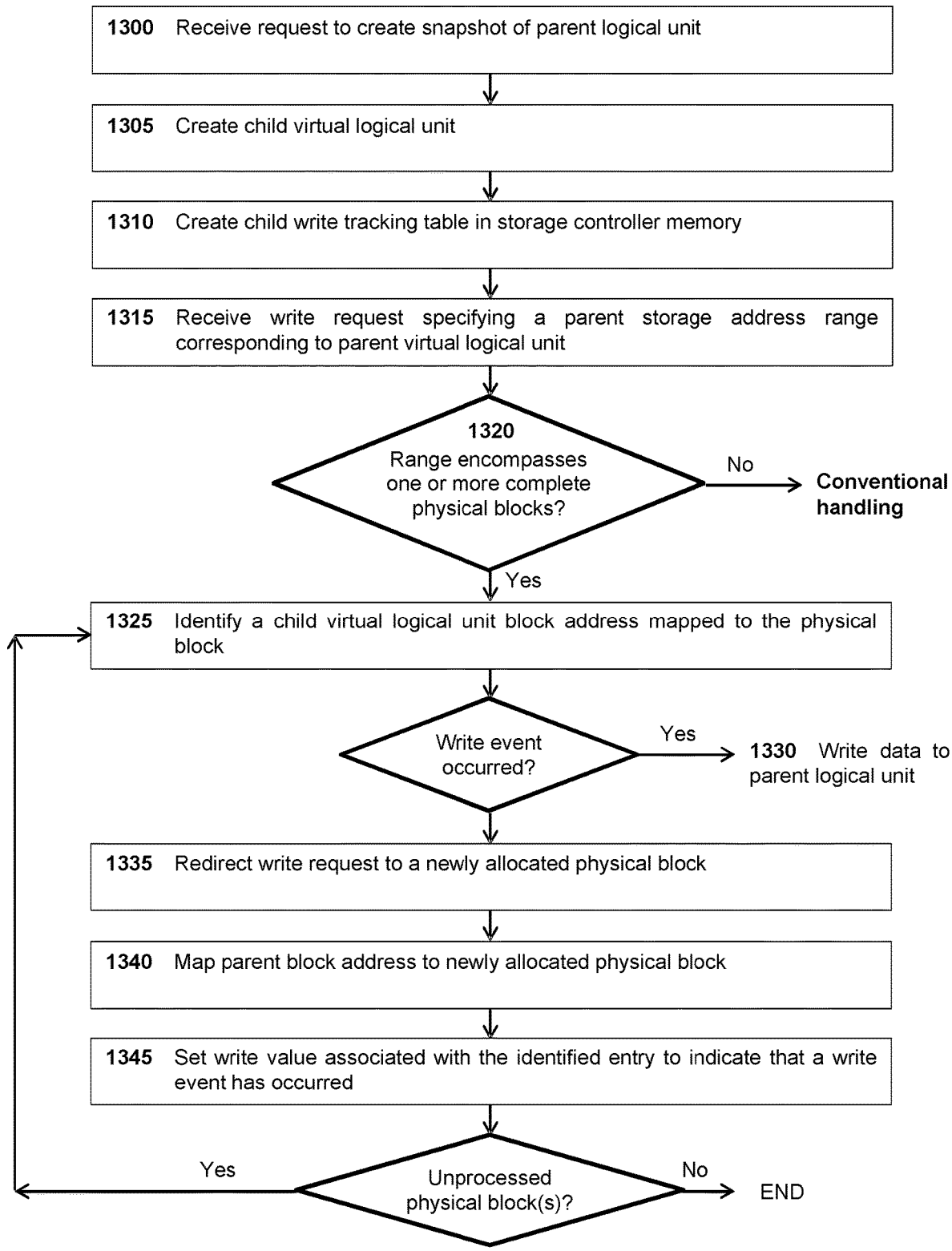
FIG. 13 is a flow diagram illustrating a SNAPSHOT command that may be performed by the storage controller of FIG. 2, according to an embodiment.

Storage controller 200 can implement a SNAPSHOT command in the manner described in connection with FIG. 13.

In step 1300, storage controller 200 receives a request from client device 115 to capture a snapshot of a parent logical unit that the storage controller 200 is coupled to.

In step 1305, storage controller 200 creates a child virtual logical unit having a child LUN. The child virtual logical unit has the same size as the parent virtual logical unit. Creation of the child virtual logical unit can be performed in conjunction with processor 230, e.g. storage controller 200 can transmit a request for creation of the child logical unit to processor 230 and receive in response the child LUN.

In step 1310, storage controller 200 can create a child write tracking table in memory 225. The child write tracking table has a header comprising the child LUN and a number of entries equal to a size of the child virtual logical unit divided by a constant, the constant being a positive integer specifying a basic unit of storage. The constant in this example is 16 KB, but the invention is not limited in this respect and any alternative value of the constant may be chosen.

Each entry of the child write tracking table includes a unique index, a child virtual logical unit block address, a write value and a mapping to a physical data block for the child virtual logical unit block address, which mapping is, at the time of creation of the child virtual logical unit, identical to a mapping for a parent virtual logical unit block address corresponding to the child virtual logical unit block address. An example child write tracking table is shown in FIG. 14.

In step 1315, storage controller 200 receives a write request specifying a parent storage address range corresponding to the parent virtual logical unit.

In step 1320, storage controller 200 identifies whether the parent storage address range encompasses one or more complete physical blocks of a physical volume that the parent virtual logical unit is mapped to. In the event that no complete physical blocks are encompassed, storage controller 200 handles the write request in a conventional manner.

In the event that the parent storage address range does encompass one or more complete physical blocks, storage controller 200 performs steps 1325 to 1345 for each complete physical block identified in step 1320.

In step 1325, storage controller 200 identifies a child virtual logical unit block address mapped to the physical block. Storage controller 200 can use the child write tracking table to identify the child block address, e.g. by identifying an entry in the child write tracking table having a physical block address equal to or within the physical block and looking up the corresponding child block address.

In step 1330, storage controller 200 determines whether an entry corresponding to the child block address in the child write tracking table has a write value indicating that a write event has not occurred. This can involve storage controller inspecting the value in the write value field of the entry within the child write tracking table that was identified in step 1325.

In the case where the write value indicates that a write event has previously occurred in respect of that child block, in step 1330 storage controller writes the data to the parent logical unit in accordance with the (unmodified) write request received in step 1315.

In the case where the write value indicates that a write event has not previously occurred in respect of that child block, in step 1335 the write request received in step 1315 is redirected to a newly allocated physical block. Here, newly allocated indicates that the physical block was previously not allocated to either the parent virtual logical unit or the child virtual logical unit, i.e. it is an 'empty' physical block as far as the parent and child logical units are concerned. The data associated with the write request received in step 1315 is written to this newly allocated physical block.

In step 1340, storage controller 200 maps the parent block address to the newly allocated physical block. The parent virtual logical unit thus now incorporates the newly written data. It will be appreciated that the parent and child virtual logical units now hold different data in respect of the virtual block address identified in step 1325, where in particular the parent virtual logical unit holds the newly written data and the child virtual logical unit holds the original data. The child virtual logical unit therefore remains a true representation of the parent logical unit as it was at the time the snapshot was generated.

In step 1345, storage controller 200 sets the write value associated with the identified entry to indicate that a write event has occurred. This can include adjusting the write value in the relevant entry of the child write tracking table, e.g. changing the write value from zero to one.

Storage controller 200 then determines whether any unprocessed physical blocks exist. In the affirmative, the process returns to step 1325 and repeats for the next unprocessed physical block. In the negative, the process ends.

It will be appreciated that steps 1300 to 1310 need only be executed when a new snapshot is created. In the case where a SNAPSHOT command has been previously issued, such that a child virtual logical unit already exists in association with the parent virtual logical unit, storage controller 200 can skip steps 1300 to 1310 and implement the process from step 1315 onwards upon receipt of a write request in respect of the parent virtual logical unit.

Advantageously, snapshots that are created and maintained in the manner described above enable the parent and child virtual logical units to be correctly maintained with only a single write operation to the storage layer. This is in contrast with prior art techniques, which require two write operations—a first write operation to copy the original data from the parent logical unit to the child logical unit, and a second write operation to write the new data to the parent logical unit. This aspect of the invention thus allows parent and child virtual logical units to be maintained accurately at lower latency. Additionally, the parent virtual logical unit has no data dependency on the child virtual logical unit, meaning that the child virtual logical unit can be discarded at any time without adverse consequences for the parent virtual logical unit.

In certain circumstances it can be desirable to allow the child virtual logical unit to be written to. In such circumstances write requests can be directed to child virtual logical unit block addresses and handled in the manner described in connection with FIGS. 6 and 9.

Configuration Commands

As touched upon earlier, storage controller 200 can be configured to forward packets that do not relate to input-output operations to processor 230 for handling. Such packets can be forwarded by a FWD_TO_CPU logic path, for example.

The following provides a non-exhaustive list of commands that processor 230 may handle. Processor 230 may handle the commands using an associated software stack that it has access to, which software stack may contain instructions for executing one or more so-called 'userspace' tools for management of the storage controller and the logical units it is responsible for.

Processor 230 can be configured to create a new logical unit or a new virtual logical unit and to store the details of this new (virtual) logical unit within storage controller memory, for use by storage controller 200 in subsequent input-output operations. Advantageously, the creation and deletion of (virtual) logical units can be performed without the need to reprogram or reconfigure the storage controller or indeed any other component of the storage area network. Lookup operations may also be performed by processor 230, where information relating to a particular logical unit is retrieved.

The creation of a new (virtual) logical unit can be performed using the following structure aoelun:

```
struct aoelun {
    u16 major;
    u8 minor;
    u8 ver_flags;
    u32 extent_count;
} _attribute_ ((packed));
``` major and minor respectively specify the shelf and slot number of the new logical unit, and extent_count specifies the size of the new logical unit in extents of a basic unit of storage. The basic unit of storage in this case is 64 KB, but other values can alternatively be used.

The aoelun structure can be used in create and delete operations, to respectively create and delete logical units. Instructions can be generated using this structure by processor 230 and passed to storage controller 200 for updating of logical unit tables contained in storage controller memory.

It will be appreciated that the invention is not restricted to the specific form of the aoelun structure and that other forms that enable the create and delete functions discussed above can alternatively be used.

Processor 230 can additionally or alternatively be configured to map part or all of a virtual logical unit to a specific set of physical storage blocks. The following structure can be used to perform this mapping:

```
struct aoev2pmap {
    u16 major;
    u8 minor;
    u8 blkflags;
    u32 virt_extent_addr;
    u32 phys_extent_addr;
} __attribute__ ((packed));
u32 extent_size_bytes = 65536;
``` major and minor respectively specify the shelf and slot number of the virtual logical unit being mapped. virt_extent_addr specifies a virtual block range of the portion of the virtual logical unit that to be mapped and phys_extent_addr specifies the physical block addresses that the portion of the virtual logical unit identified by virt_extent_addr is being mapped to. The field extent_size_bytes stores the basic unit of storage, which as noted above in this example is 64 KB. Lookup operations may also be performed by processor 230, where information relating to a particular logical unit mapping is retrieved.

The aoev2pmap structure can be used in logical unit management operations, e.g. to map physical blocks to virtual blocks and to delete mappings between virtual and physical blocks that have already been established. The aoev2pmap structure can underpin the block address translation table of FIG. 10, for example. Instructions can be generated using this structure by processor 230 and passed to storage controller 200 for updating of logical unit tables contained in storage controller memory.

It will be appreciated that the invention is not restricted to the specific form of the aoev2pmap structure and that other forms that enable the create and delete functions discussed above can alternatively be used.

Processor 230 can also be configured to access a network interface component in order to receive and transmit packets, so as to enable processor 230 to communicate with other (remote) storage controllers. The network interface component is conventional and so is not described in further detail here.

It will be appreciated that any of the steps described above can be performed by a storage controller acting in accordance with computer-readable instructions encoded on a storage medium, which storage medium may be a non-transitory storage medium. The invention thus encompasses one or more storage media encoding instructions that, when executed, cause a storage controller to implement any aspect of the invention described above.

FIG. 15 illustrates one particular configuration for implementing storage controller 200, according to an embodiment. This configuration is purely exemplary and many modifications to this configuration will be apparent to a person skilled in the art.

In this configuration, integrated circuit 205 is a FPGA having the circuit blocks discussed below. General purpose processor 230 is a Cortex® A53 processor as produced by Arm® of Cambridge, UK. Processor 230 is communicatively coupled to a memory module 225, which may be a Double Data Rate Synchronous Dynamic Random-Access Memory (DDR SDRAM) module. Memory module 225 can store one or more virtual LUN tables of the type discussed above.

Processor 230 is coupled to a kernel module 1500, which in this case is a Linux kernel module ('sunstore'). Kernel module 1500 provides an interface between the software stack executed by processor 230 and the FPGA hardware. The software stack contains the necessary information to initialise the various components of FPGA 205, as well as providing an entity for management of the virtual LUN tables stored in memory 225 and the LUN tables stored in BRAM 1515.

aoeParser 1510

Incoming network traffic, aoeStreamIn, is processed by aoeParser 1510, which is configured to forward incoming packets to the appropriate circuit block. aoeParser 1510 can process incoming packets by extracting the source and destination MAC addresses, AoE command type and ATA command type, which information can then be used to route the incoming packet accordingly.

In the case where the command is an input-output command, e.g. READ, WRITE, WRITE MIRROR, COPY commands, aoeParser 1510 is configured to extract the major and minor numbers, the logical block address and the number of sectors from the packet. aoeParser 1510 can then read the LUN table (FIG. 10a) that is stored in a high speed memory module 1515, which in this case is a block RAM (BRAM) module, at the position described in the major number. This enables aoeParser 1510 to retrieve the physical address of the corresponding virtual LUN table in the memory module 1500.

aoeParser 1510 retrieves from the virtual LUN table a physical chunk offset, which is 16 MB in this particular case, and a diskID based on the logical block address extracted from the packet. Having obtained this information, aoeParser 1510 then forwards the packet to reqSwitch 1520 described below.

reqSwitch reqSwitch 1520 is an Advanced Extensible Interface (AXI) switch, as known in the art per se. Other switches can alternatively be used. reqSwitch 1520 is configured to multiplex packets between the various request processors 1525, e.g. reqProc_0, where the switching is based on the diskID extracted by aoeParser 1510.

reqProc

FPGA 205 includes one or more request processors 1525. Only one request processor, reqProc_0, is shown in FIG. 15 for brevity, with ellipses being used to symbolise further request processors (in this case three additional request processors, reqProc_1, reqProc_2 and reqProc_3).

Each request processor is configured to translate an incoming AoE Ethernet packet into an ATA format command for issuing to the storage layer via NVMe host controller 1535. In this particular implementation, request processor 1525 communicates with the storage layer via three memory modules 1530 that act as buffers. Two of these modules are UltraRAM ('URAM') modules as known in the art per se, and one is a BRAM module, also as known in the art per se. The memory modules 1530 are configured as rings, which configuration is known in the art per se. It will be appreciated that memory modules 1530 are specific to each request processor 1525, such that if there are N request processors, 3N memory modules are present.

Memory modules 1530 include an rspInfo BRAM module that stores information about a request, e.g. MAC address, in order to be able to generate a corresponding response. A wrBuff URAM module is also provided, which is used to store payload data for WRITE commands. A rdBuff URAM module is additionally provided, which module stores data retrieved from the storage layer as part of a READ command.

NVMe Host Controller

FPGA 205 additionally includes one or more non-volatile memory express (NVMe) host controller interfaces for facilitating communication between FPGA 205 and one or more storage devices. In the present case NVMe host controller 1535 is an NVMe host controller as known in the art per se. NVMe host controller 1535 is configured to read the wrBuff URAM module to access data that is to be written to the storage layer, and is further configured to write data retrieved from the storage layer to the rdBuff_0 URAM module.

It will be appreciated that NVMe host controller 1535 is specific to each request processor 1525, such that if there are N request processors, N NVMe host controllers are also present.

Response Processor

FPGA 205 further includes one or more response processors 1540. The response processors are configured to receive responses from NVMe host controller 1535 and translate the responses into AoE format network packets for return to client device 115.

It will be appreciated that response processor 1540 is specific to each request processor 1525, such that if there are N request processors, N response processors are also present.

resSwitch resSwitch 1545 is an Advanced Extensible Interface (AXI) switch as known in the art per se. Other switches can alternatively be used. resSwitch 1540 is configured to multiplex packets received from the various request processors 1525, e.g. reqProc_0, where the switching is based on the destination MAC address. resSwitch 1545 routes packets to a main FPGA switch (not shown in FIG. 15) for routing out of FPGA 205 to a destination.

Numerous modifications, extensions, substitutions and the like will be apparent to a person skilled in the art having the present disclosure. Such changes are also within the scope of the invention. Where method steps are described, unless specifically stated, such steps can be performed in any order.

The invention claimed is:

1. A computer-implemented method for operating a storage controller, the storage controller comprising a storage controller memory and an integrated circuit having a plurality of logic paths each comprising one or more logic blocks, the storage controller coupled to a client device via a network, the method comprising:
   a) receiving, by the storage controller, a packet from the client device sent over the network; and
   b) attempting, by the storage controller, to identify a command associated with the packet, the command for performing an input-output operation in respect of a storage medium, wherein step b) further comprises:
   inspecting by the storage controller, a header of the packet to identify a destination address specifying a logical unit having an associated logical unit number, LUN, a block address and a block size;
   wherein, responsive to the storage controller successfully identifying a command associated with the packet, the method further comprises:
   c) selecting, by the storage controller and based on the identified command, a selected logic path corresponding to the identified command from the plurality of logic paths; and
   d) executing, by the storage controller, the identified command using the selected logic path, wherein the identified command is a WRITE command and the destination address is local to the storage controller, and wherein step d) further comprises:
   extracting, by the storage controller, the destination address, the block address, the block, size and a data payload from the packet, the block size corresponding to a size of the data payload;
   storing, by the storage controller, the data payload in the storage controller memory;
   creating, by the storage controller, a first request comprising a WRITE request, the WRITE request including the block address, the block size and a pointer to the location of the data payload in the storage controller memory;
   transmitting, by the storage controller, the WRITE request to a volume controller associated with the logical unit corresponding to the LUN;
   receiving, by the storage controller, a response to the WRITE request from the volume controller;
   responsive to said response indicating that no error has occurred, creating, by the storage controller, a response packet including an indication that the WRITE operation was successful;
   transmitting, by the storage controller, the response packet to the client device via the network;
   extracting, by the storage controller, a mirror list from the packet, the mirror list comprising one or more destination addresses specifying a respective one or more mirror logical units having respective mirror LUNs;
   the method further comprising:
   creating, by the storage controller using a further one of the plurality of logic paths, a WRITE packet for each entry in the mirror list, each WRITE packet having a destination address in a packet header set equal to a respective one of the one or more destination addresses and having a mirror data payload containing the data payload;
   responsive to a WRITE packet having a destination address that is local to the storage controller, performing, by the storage controller, a WRITE request in respect of that WRITE packet; and
   responsive to a WRITE packet having a destination address that is not local to the storage controller, transmitting, by the storage controller, that WRITE packet to a remote storage controller corresponding to the destination address of that WRITE packet.

2. The computer-implemented method of claim 1, wherein the identified command is a READ command and the destination address is local to the storage controller, wherein step d) further comprises:
   extracting, by the storage controller, the destination address, the block address and the block size from the packet;
   allocating, by the storage controller, a memory region within the storage controller memory suitable for storing data having a size equal to the block size; creating, by the storage controller, a first request comprising a READ request, the READ request including a pointer to the allocated memory region, the block address and the block size;
   transmitting, by the storage controller, the REND request to a volume controller associated with the logical unit corresponding to the LUN;
   receiving, by the storage controller, a response to the READ request from the volume controller;
   in the event the response indicates that no error has occurred, creating, by the storage controller, a response packet including the contents of the memory region; and
   transmitting, by the storage controller, the response packet to the client device via the network.

3. The computer-implemented method of claim 1, wherein the identified command is a COPY command and the destination address is local to the storage controller; and wherein step d) further comprises:
   extracting, by the storage controller, the destination address, the block address and the block size from the packet;
   allocating, by the storage controller, a memory region within the storage controller memory suitable for storing data having a size equal to the block size;
   creating, by the storage controller, a first request comprising a READ request, the READ request including a pointer to the allocated memory region, the block address and the block size;
   transmitting, by the storage controller, the READ request to a volume controller associated with the logical unit corresponding to the LUN;
   receiving, by the storage controller, a response to the READ request from the volume controller;
   responsive to said response indicating that no error has occurred:
      extracting, by the storage controller, a mirror list from the packet, the mirror list comprising one or more destination addresses specifying a respective one or more mirror logical units having respective mirror LUNs;
   the method further comprising:
      creating, by the storage controller, a WRITE packet for each entry in the mirror list, each WRITE packet having:
         a destination address in a packet header set equal to a respective one of the one or more destination addresses; and
         a data payload comprising the contents of the allocated memory region;
      responsive to a WRITE packet having a destination address that is local to the storage controller, performing, by the storage controller, a WRITE request in respect of that WRITE packet; and
      responsive to a WRITE packet having a destination address that is not local to the storage controller, transmitting, by the storage controller, that WRITE packet to a storage controller corresponding to the destination address of that WRITE packet.

4. The computer-implemented method of claim 2, wherein the logical unit specified in the destination address is a virtual logical unit, the LUN is a virtual LUN and the block address is a virtual block address, wherein step d) further comprises:
   e) translating, by the storage controller, a virtual storage region of the virtual logical unit starting at the virtual block address and having a size equal to the block size to a physical storage region of a physical logical unit, the physical storage region starting at a physical block address and having a size equal to the block size;
   and wherein the first request is transmitted to the physical logical unit, the first request including the physical block address.

5. The computer-implemented method of claim 4, wherein:
   the storage controller memory contains a virtual LUN table and a block address translation table;
   the block address translation table comprises at least one entry having a virtual block address and a corresponding physical block address; and
   the virtual LIMN table defines at least one virtual LUN according to the following:
      a virtual LUN index uniquely identifying the at least one virtual LUN;
      a virtual LUN size defined as a positive integer multiple of a constant, the constant being an integer specifying a basic unit of storage having a basic block size; and
      a pointer to a start virtual block address in the block address translation table, the start virtual block address defining a start of a virtual storage region allocated to the at least one virtual LUN;
   and wherein step e) further comprises, by the storage controller:
      attempting to identify a first entry in the virtual LUN table corresponding to the logical unit identified in the destination address;
      responsive to said attempting resulting in successful identification, identifying a first virtual block address in the block address translation table, the first virtual block address referenced by the pointer in the first entry;
      identifying a first physical block address associated with the first virtual block address in the block address translation table; and
      defining the physical storage region as a storage region starting at the first physical block address and having a size equal to the block size.

6. The computer-implemented method of claim 1, wherein the storage controller is coupled to a local logical unit having a local LUN, and wherein the storage controller memory contains a write tracking table, the write tracking table comprising:
   a header comprising the local LUN; and
   a number of entries equal to a size of the local logical unit divided by a constant, the constant being an integer specifying a basic unit of storage having a basic storage size;
   wherein each entry includes a unique index, a write value and a local logical unit storage block defined by a storage region starting at a local logical unit block address and extending for a size equal to the constant;
   and wherein step d) further comprises:
      detecting, by the storage controller, a successful write event to the local logical unit, the write event occurring within a write storage region of the local logical unit;
      identifying, by the storage controller, one or more identified entries in the write tracking table, each identified entry having a local logical unit storage region having at least one block address within the write storage region; and setting the write value associated with the identified entry to indicate that a write event has occurred.

7. The computer-implemented method of claim 1, wherein the storage controller is coupled to a parent virtual logical unit having a parent LUN; the method further comprising:
   receiving, by the storage controller, a request from the client device to capture a snapshot of the parent virtual logical unit;
   creating, by the storage controller, a child virtual logical unit having a child LUN, the child virtual logical unit having the same size as the parent virtual logical unit;
   creating, by the storage controller and in the storage controller memory, a child write tracking table comprising:
      a header comprising the child LUN; and
      a number of entries equal to a size of the child virtual logical unit divided by a constant, the constant being a positive integer specifying a basic unit of storage;

wherein each entry includes a unique index, a child virtual logical unit block address, a write value and a mapping to a physical data block for the child virtual logical unit block address, which mapping is, at the time of creation of the child virtual logical unit, identical to a mapping for a parent virtual logical unit block address corresponding to the child virtual logical unit block address;

receiving, by the storage controller, a write request specifying a parent storage address range corresponding to the parent virtual logical unit;

identifying, by the storage controller, whether the parent storage address range encompasses one or more complete physical blocks of a physical volume that the parent virtual logical unit is mapped to;

wherein, in the affirmative, the method further comprises, for each physical block of the one or more complete physical blocks:

identifying, by the storage controller, a child virtual logical unit block address mapped to the physical block;

determining, by the storage controller, whether an entry corresponding to the child virtual logical unit block address in the child write tracking table has a write value indicating that a write event has not occurred;

wherein, in the affirmative, the method further comprises, by the storage controller:

redirecting the write request to a newly allocated physical block; mapping the parent virtual logical unit block address to the newly allocated physical block; and setting the write value associated with the identified entry in the child write tracking table to indicate that a write event has occurred.

8. The computer-implemented method of claim 1, wherein step b) further comprises:

inspecting, by the storage controller, a header of the packet to identify a destination address specifying a logical unit, a block address and a block size; determining, by the storage controller, that the logical unit is not local to the storage controller;

and wherein step d) further comprises:

routing the packet to another storage controller.

9. The computer-implemented method of claim 1, wherein the integrated circuit comprises one or more reconfigurable hardware components.

10. The computer-implemented method of claim 1, wherein the packet is formatted according to a packet-based network protocol and the command is formatted according to a mass storage device protocol, optionally wherein the packet is an Advanced Technology Attachment over Ethernet (AoE) packet and wherein the command is an Advanced Technology Attachment (ATA) command.

11. A storage controller configured to carry out the method of claim 1.

12. A computer-readable storage medium storing instructions which, when executed by a storage controller, cause the storage controller to carry out the method of claim 1.

13. The computer-implemented method of claim 9, wherein the one or more reconfigurable hardware components are each field-programmable gate arrays.

* * * * *